United States Patent [19]
Trompower et al.

[11] Patent Number: 6,088,591
[45] Date of Patent: *Jul. 11, 2000

[54] CELLULAR SYSTEM HAND-OFF PROTOCOL

[75] Inventors: Michael L. Trompower, Navarre, Ohio; Douglas A. Smith, Pickering, Canada; Philip H. Belanger, Akron, Ohio; Andrew J. Spry, Uniontown, Ohio; Nainesh P. Shah, Parma, Ohio

[73] Assignee: Aironet Wireless Communications, Inc., Fairlawn, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/672,751

[22] Filed: Jun. 28, 1996

[51] Int. Cl.[7] .................................................. H04B 7/22
[52] U.S. Cl. ..................... 455/438; 455/435; 455/439; 370/331; 375/202
[58] Field of Search .................................. 455/436, 438, 455/439, 432, 434, 515, 450, 452, 453, 435; 370/330, 331; 375/202

[56] References Cited

U.S. PATENT DOCUMENTS

| | | | |
|---|---|---|---|
| 4,554,668 | 11/1985 | Deman et al. | 375/107 |
| 5,123,029 | 6/1992 | Bantz et al. | |
| 5,189,734 | 2/1993 | Bailey et al. | 455/33.2 |
| 5,287,384 | 2/1994 | Avery et al. | |
| 5,317,623 | 5/1994 | Sakamoto et al. | |
| 5,325,419 | 6/1994 | Connolly et al. | 379/60 |
| 5,329,531 | 7/1994 | Dieptraten et al. | 370/347 |
| 5,373,503 | 12/1994 | Chen | 370/346 |
| 5,386,435 | 1/1995 | Cooper et al. | 375/1 |
| 5,418,838 | 5/1995 | Havermans et al. | 379/60 |
| 5,425,049 | 6/1995 | Dent | 375/202 |
| 5,446,769 | 8/1995 | Shaver et al. | |
| 5,499,387 | 3/1996 | Chambert | 455/33.2 |
| 5,519,706 | 5/1996 | Bantz et al. | 370/85.3 |
| 5,574,979 | 11/1996 | West | 455/63 |
| 5,619,493 | 4/1997 | Ritz et al. | 370/330 |
| 5,655,217 | 8/1997 | Lemson | 455/513 |
| 5,737,358 | 4/1998 | Ritz et al. | 375/202 |
| 5,748,669 | 5/1998 | Yada | 375/202 |
| 5,771,353 | 6/1998 | Eggleston et al. | 395/200.57 |
| 5,774,461 | 6/1998 | Hyden et al. | 370/329 |
| 5,781,536 | 7/1998 | Anmadi et al. | 370/252 |
| 5,794,145 | 8/1998 | Milam | 455/426 |
| 5,848,064 | 12/1998 | Cowan | 370/338 |
| 5,862,142 | 1/1999 | Takiyasu et al. | 370/480 |

FOREIGN PATENT DOCUMENTS

589552A2  7/1993  European Pat. Off. .

OTHER PUBLICATIONS

IPCCC '92, pp. 0255–0259, "A Hybrid Indoor Data Network with Radio and Wire Performance Evaluation in a Rayleigh Channel" by Kaname Arai, Hiroshi Shigeno, Teruo Yokoyama, Yutaka Matsushita.

*Primary Examiner*—Edward F. Urban
*Assistant Examiner*—Conguan Tran
*Attorney, Agent, or Firm*—Arter & Hadden LLP

[57] ABSTRACT

A cellular communication system hand-off protocol which helps minimize down time associated with a mobile device roaming among different cells in which different cells employ different communication channels (e.g., different frequency hopping sequences). In a preferred embodiment, each base station is configured to communicate its own particular hopping sequence to all other base stations via the system backbone. Each base station then provides to mobile devices which are registered thereto information regarding the particular hopping sequences employed by other base stations servicing cells into which the mobile device may roam. Such information includes the particular hopping sequences together with an indication of what location in the sequence the base stations are currently at in any given time. In addition, such information may include an indication of the intervals at which a base station is configured to transmit a beacon packet (for passive scanning operation), or at what intervals test pattern packets are transmitted to allow for signal quality evaluation.

46 Claims, 17 Drawing Sheets

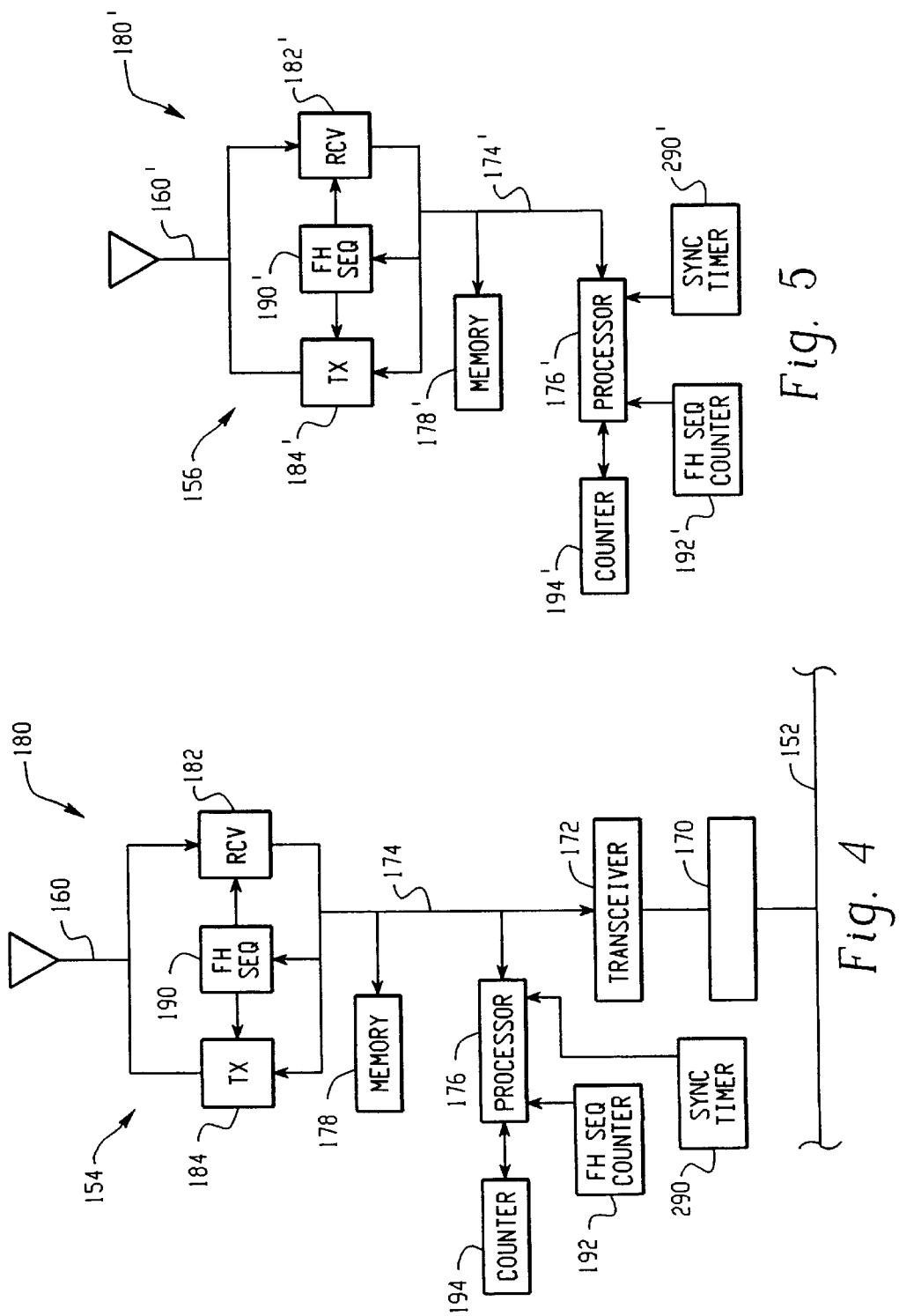

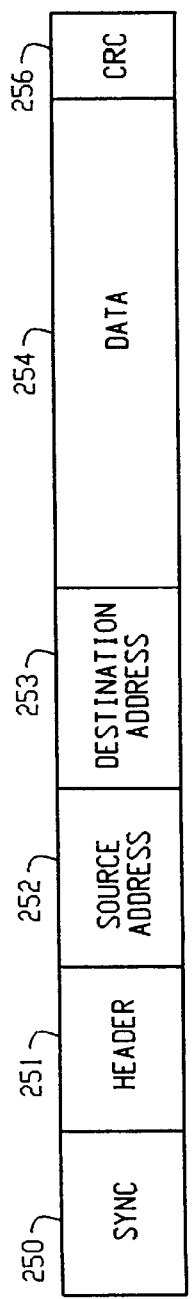
Fig. 7
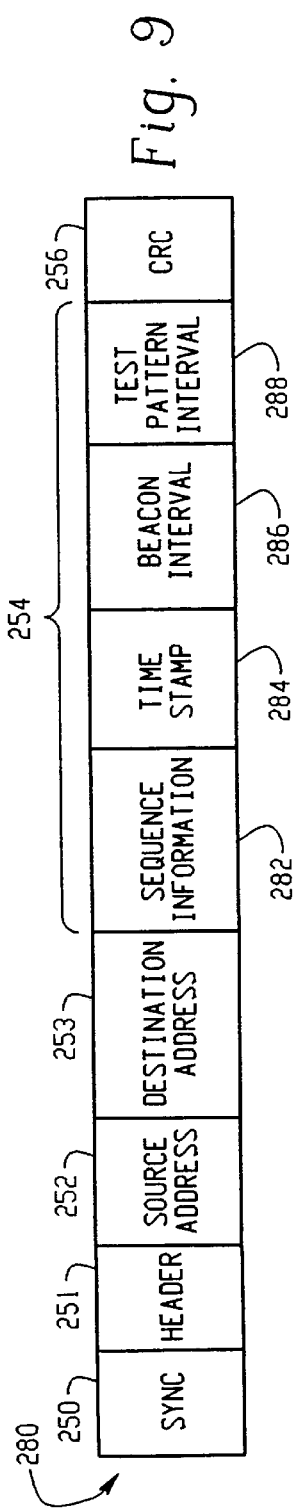
Fig. 8
Fig. 9

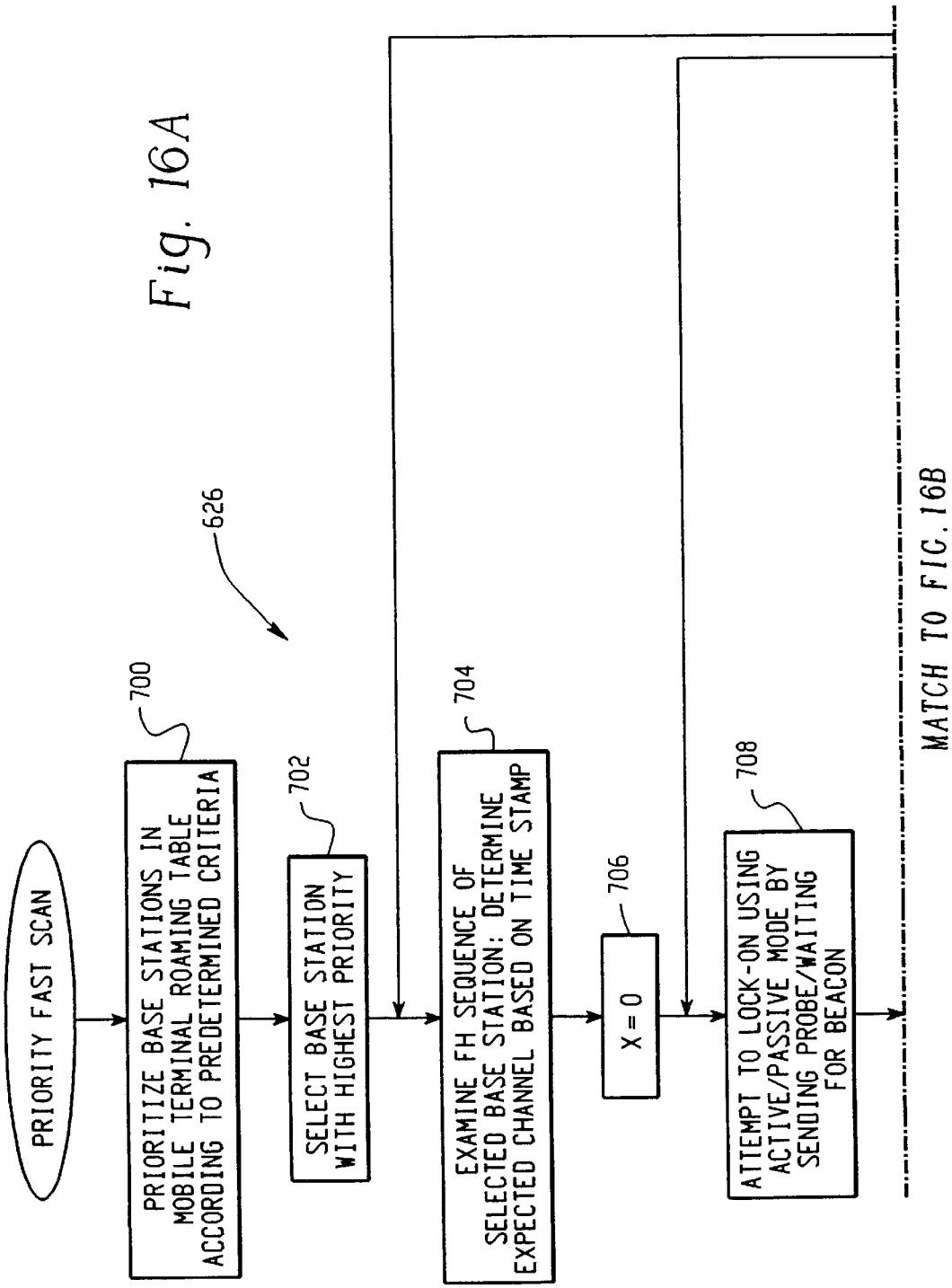

CELLULAR SYSTEM HAND-OFF PROTOCOL

TECHNICAL FIELD

The present invention relates generally to a cellular communication system, and more particularly to a hand-off protocol between cells in a cellular communication system.

BACKGROUND OF THE INVENTION

In recent years, the use of cellular communication systems having mobile devices which communicate with a hardwired network, such as a local area network (LAN) or a wide area network (WAN), has become widespread. Retail stores and warehouses, for example, may use cellular communication systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographic regions while retaining telephonic access. Paging networks also may utilize cellular communication systems which enable a user carrying a pocket sized pager to be paged anywhere within a geographic region.

A typical cellular communication system includes a number of fixed base stations interconnected by a cable medium often referred to as a system backbone. Also included in many cellular communication systems are intermediate base stations which are not directly connected to the system backbone but otherwise perform many of the same functions as the fixed base stations. Intermediate base stations, often referred to as wireless base stations, increase the area within which base stations connected to the system backbone can communicate with mobile devices. Unless otherwise indicated, the term "base station" will hereinafter refer to both base stations hardwired to the system backbone and wireless base stations.

Associated with each base station is a geographic cell. Such cell is a geographic area in which a base station has sufficient signal strength to transmit data to and receive data from a mobile device such as a data terminal or telephone with an acceptable error rate. Typically, base stations will be positioned along the backbone such that the combined cell area coverage from each base station provides full coverage of a building or site.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and a base station to which the mobile device is registered. As the mobile device roams from one cell to another, the mobile device will typically deregister with the base station of the previous cell and register with the base station associated with the new cell.

Cellular communication systems such as those described above often involve spread spectrum (SS) technology. An SS communication system is one in which the transmitted frequency spectrum or bandwidth is much wider than absolutely necessary. Generally, SS technology is utilized for communications in the unlicensed bands provided by the FCC for low power communication devices. These bands include the 902–928 MHZ and 2.4–2.48 GHz ranges in the U.S., although SS communication may occur in any allowable range. The FCC requires that information transmitted in these bands be spread and coded in order to allow multiple user access to these bands at the same time.

One type of SS communication system is known as a frequency hopping spread spectrum (FHSS) system. The coding scheme for a FHSS system utilizes a pseudo-random hopping sequence whereby information is sent using a sequence of carrier frequencies that change at intervals to produce a narrow band signal that "hops" around in center frequency over the available spectrum. Only transmitters and receivers hopping on the same sequence are capable of communication with one another. Thus, multiple users can share the same bandwidths without significant interference by selecting different pseudo-random hopping sequences with which to communicate.

The FCC provides rules governing the use of FHSS systems. For example, if communicating in the 2.4–2.48 GHz unlicensed band, the FCC provides that FHSS systems must have at least 75 hopping frequencies, or channels, separated by at least 25 kHz, and the average time of occupancy (or "dwell time") on any given channel must not be greater than 0.4 seconds in any 30 second period. This means that a maximum possible dwell time on any given channel is 400 milliseconds (msec), and typically will be about 100 msec.

In a FHSS system, each base station is typically required to communicate using a different hopping sequence including different channels and/or a different order of channels. Therefore, in order for a mobile device to roam from cell to cell, it must be able to "lock-on" to each new hopping sequence it encounters. In conventional systems, mobile devices typically use either an active or passive scanning mode to lock-on to a new hopping sequence associated with a new base station to which it wishes to register upon loss of communications with the base station to which it had been registered. Unfortunately, there have been several drawbacks associated with conventional active or passive scanning as will now be discussed.

FIG. 1 represents the sequence of operations involved in a typical active scanning mode. If operating in the active scanning mode, a mobile device initially selects a channel and sends out a probe packet to determine whether any base station within range is currently communicating on that channel. The mobile terminal then waits for a predetermined period of time during which a probe response packet should be received from the base station on that channel provided a base station is currently on the channel. More specifically, in step 100 the mobile device sets its transmitter and receiver to operate on a selected one of the possible hopping frequencies or channels within the system. Next, in step 102 the mobile device transmits a probe packet on the selected channel. The probe packet indicates to any base station within range and communicating on the same channel that the mobile device would like information regarding the particular hopping sequence employed by the receiving base station.

In step 104, the mobile device determines if a probe response packet has been received by the mobile device within a predetermined period of time (e.g., 6 msec) following the transmission of the probe packet. If no probe response packet is received in step 104, the mobile device selects another possible hopping channel within the system and sets its receiver and transmitter to operate on the newly selected channel as represented in step 106. Following step 106, the mobile device returns to step 102 and transmits a probe packet on the newly selected channel. Steps 102, 104 and 106 are repeated until the mobile device receives a probe response packet and is able to lock-on to a new hopping sequence. More specifically, when a probe response is received in step 104, the mobile device proceeds to step 108 in which the hopping sequence of the base station is determined based on the contents of the probe response packet. Timing information included in the probe response packet allows the mobile device to then lock-on to the hopping sequence. Typically, the amount of time the mobile device remains on any one channel while actively scanning is short compared to the amount of time a base station dwells on a given channel. Therefore, the mobile terminal can scan through each possible channel and will ultimately receive a probe response, albeit after some time delay. Depending on where a base station is in its hopping sequence and the order in which the mobile device selects different channels on which to transmit a probe packet, the mobile device may have to cycle through all of the possible hopping channels (e.g., all 75 or more channels) numerous times before hitting on the same channel that a base station within range is currently on in its hopping sequence. Thus, a time delay may exist anywhere between 0 to 10 seconds, for example, before the mobile device determines the hopping sequence of a new base station with which to register.

In a passive scanning mode, a mobile device does not send out probe packets to determine whether a base station is currently on the same channel. Rather, the base stations are configured to periodically transmit beacon packets indicating the particular hopping sequence utilized by the base station. Each mobile device simply stays on a given one of the possible hopping channels and waits to receive a beacon packet from a base station. The beacon packet provides the mobile device with hopping sequence and timing information which allows the mobile device to lock-on to the new hopping sequence.

FIG. 2 represents another passive scanning mode technique in which a mobile device periodically hop from channel to channel waiting to receive a beacon packet. For example, in step 110 the mobile device sets its receiver to operate on a selected one of the possible hopping channels. Next, in step 112 the mobile device stays on the selected channel and waits a predetermined period of time (e.g., 10 msec) to receive a beacon packet on the selected channel. In step 114 the mobile device determines if a beacon packet was received. If no, the mobile device proceeds to step 116 in which the mobile device selects another hopping channel and sets its receiver to operate on the newly selected channel. Thereafter, the mobile device returns to step 112 and again waits a predetermined time to receive a beacon packet. Steps 112, 114 and 116 are repeated until such time as a beacon packet is received as determined in step 114. At that time, the mobile device proceeds to step 118 in which the mobile device locks on to the hopping sequence of the base station transmitting the beacon packet based on the information provided in the beacon packet.

Therefore, by remaining on one channel or by sequencing through the various hopping channels waiting to receive a beacon packet, the mobile device will eventually receive a beacon packet. However, as with the active scanning mode there will be an indefinite time delay before a beacon packet is received and the mobile device is able to lock-on to the hopping sequence of another base station. Such time delay could be, for example, anywhere from zero to ten seconds.

Unfortunately, during those times that a mobile device is not registered to a base station or is otherwise attempting to register with a new base station, no communication can occur between the mobile device and devices situated on the system backbone. As a result, users often experience down time where it appears that their mobile device has locked up so as not to permit communications. This can be both frustrating to the user and detrimental to the overall system performance. Similar situations may also occur in other systems having base stations each communicating on different communication channels as produced by using different modulation types or PN codes, for example.

In view of the aforementioned shortcomings associated with conventional cellular systems, there is a strong need in the art for a system and method which help minimize the delay times associated with mobile devices locking on to new hopping sequences or other communication channels when roaming from one cell to another, or searching for a different communication channel in the same cell area. Moreover, there is a strong need in the art for improved active and passive scanning techniques which further reduce conventional delay times.

SUMMARY OF THE INVENTION

The present invention involves a cellular communication system hand-off protocol which helps minimize down time associated with a mobile device roaming among different cells in which different cells employ different communication channels (e.g., different frequency hopping sequences). In a preferred embodiment, each base station is configured to communicate its own particular hopping sequence to all other base stations via the system backbone. Each base station then provides to mobile devices which are registered thereto information regarding the particular hopping sequences employed by other base stations servicing cells into which the mobile device may roam. Such information includes the particular hopping sequences together with an indication of what position in the sequence the base stations are currently at in any given time. In addition, such information may include an indication of the intervals at which a base station is configured to transmit a beacon packet (for passive scanning operation), or at what intervals test pattern packets are transmitted to allow for signal quality evaluation.

Accordingly, a mobile device searching for another base station can immediately jump to a channel where a base station is expected to be. Using either an active or passive scanning mode, the mobile device can then transmit a probe packet or wait to receive a beacon packet. Since the mobile device effectively knows where in the hopping sequence a base station currently is, substantial time is saved as compared to conventional techniques which required the mobile device to search essentially randomly through the possible channels. In order to account for time delays and/or slight timing offsets within the system, the mobile devices are configured to scan one or more channels before/ahead of the expected channel.

Mobile devices which roam from one cell to another provide the new base station with updated hopping sequence information of the previous base station. Thus, the base stations are able to maintain updated information regarding the particular hopping sequence and timing of the other base stations. By passing along hopping sequence information of other base stations to a mobile device, the mobile device will ordinarily spend only a very short time searching for the hopping sequence of an alternate base station, thereby minimizing device down time otherwise associated with roaming. In addition the information will also allow base stations to select channel parameters which are distinct from any other base station communicating within the same cell area. Furthermore, the present invention presents improved active and passive scanning methods which further enhance system performance.

According to one particular aspect of the invention, a method is provided for a cellular communication system including a backbone, a first base station and a second base station each coupled to the backbone. Each of the base stations communicate on a selected one of a plurality of communication channels. The method includes the steps of the second base station conveying to the first base station information related to the communication channel of the second base station and the first base station receiving the information.

In another aspect of the invention, a method is provided for a cellular communication system which includes a backbone and a plurality of base stations each coupled to the backbone. Each of the base stations communicates on a selected one of a plurality of communication channels. The method provides for informing a mobile device registered to a first of the plurality of base stations of communication channel information related to a second of the plurality of base stations. The method includes the steps of the second base station conveying to the first base station information related to the communication channel of the second base station, the first base station receiving the information, and the first base station transmitting at least a portion of the information to the mobile device.

In accordance with still another aspect of the invention, a cellular communication system is provided which includes a backbone, a plurality of base stations each coupled to the backbone, and each of the base stations communicating on one of a plurality of different communication channels. The system further includes at least one mobile device, each of the mobile devices communicating with said backbone via a selected one of the plurality of base stations. Each of the base stations include wireless communication means for communicating information between the backbone and any of the at least one mobile devices which are registered to the base station, means for conveying communication channel information to other of the plurality of base stations in the cellular communication system, means for receiving communication channel from the other base stations, and means for wirelessly transmitting at least a portion of the communication channel information received to mobile devices currently registered to the base station.

In accordance with yet another aspect of the invention, a base station is provided for use in a cellular communication system, including the base station along with at least one similar base station each which are coupled to a backbone. Each of the base stations potentially serve as a respective wireless communication link between the backbone and at least one mobile device registered thereto. The base station includes a wireless communication means for communicating information between the backbone and any of the at least one mobile devices which are registered to the base station, means for conveying communication channel information to other of the at least one similar base stations in the cellular communication system, means for receiving communication channel information from the other similar base stations, and means for wirelessly transmitting at least a portion of the communication channel information received to mobile devices currently registered to the base station.

According to another aspect of the invention, a method is provided for a cellular communication system which includes a backbone and a plurality of base stations each coupled to the backbone. Each of the base stations communicates on a selected one of a plurality of communication channels. The method involves transmitting to a first of the plurality of base stations communications channel information related to another of the plurality of base stations by a mobile device and receiving the communication channel information by the first base station.

In accordance with yet another aspect of the invention, a method is provided to facilitate a mobile terminal's ability to lock-on to a base station communication channel upon the mobile terminal passively scanning for the communication channel by listening for beacons transmitted by the base station. This method comprises the step of decreasing an interval between which beacons are transmitted by the base station if current traffic load on the base station is below an predetermined threshold.

According to another aspect of the invention, a mobile device is provided for use in a cellular communication system. The cellular communication system includes backbone and a plurality of base stations coupled thereto. The mobile device is capable of communicating with the backbone via one of the plurality of base stations to which the mobile device is currently registered. The mobile device includes a wireless communication means for communicating information between the mobile device and the backbone, means for receiving roaming information from the one base station, the roaming information including communication channel information related to other of the base stations, and means for jumping directly to a communication channel at which one of the other base stations is expected to be based in part on received roaming information.

According to another aspect of the invention, a mobile device is provided for use in a cellular communication system. The cellular communication system includes a backbone and a plurality of base stations coupled thereto. The mobile device is capable of communicating with the backbone via one of the plurality of base stations to which the mobile device is currently registered. The mobile device includes wireless communication means for communicating information between the mobile device and the backbone, means for receiving hop sequence information related to other of the base stations from the one base station, means for storing the hop sequence information, means for computing a communication channel at which at least one of the other base stations is expected to be based on the hop sequence information, and means for jumping directly to the communication channel.

In a further aspect of the invention, a method is provided for a cellular communication system which includes a backbone and a plurality of base stations each coupled to the backbone. Each of the base stations communicates on a selected one of a plurality of communication channels. The method includes the steps of conveying from the second base station to the first base station information related to the second base station's hopping sequence, receiving the information by the first base station, storing the information in memory associated with the first base station, computing within the first base station a communication channel upon which the second base station is expected to be based on the information stored in the first base station, transmitting from the first base station to a registered mobile device the communication channel computed, and receiving the communication channel computed by the mobile device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 is a block diagram of a base station in accordance with the present invention;

FIG. 5 is a block diagram of a wireless base station in accordance with the present invention;

FIG. 7 is a schematic diagram of the contents of a frequency hopping sequence table maintained in memory in each base station and mobile terminal for identifying the particular frequency hopping sequences available in the cellular communication system in accordance with the present invention;

FIG. 8 is a schematic diagram representing an exemplary format for information packets which are communicated between devices in the cellular communication system in accordance with the present invention;

FIG. 9 is a schematic diagram representing an entry response packet used by base stations to communicate particular hopping sequence and timing information to other base stations in accordance with the present invention;

FIG. 16A–16B show a flowchart representing a priority fast scan routine executed by a mobile terminal when attempting to register with a new base station in accordance with the present invention;

DESCRIPTION OF THE PREFERRED EMBODIMENTS

Figure 2:
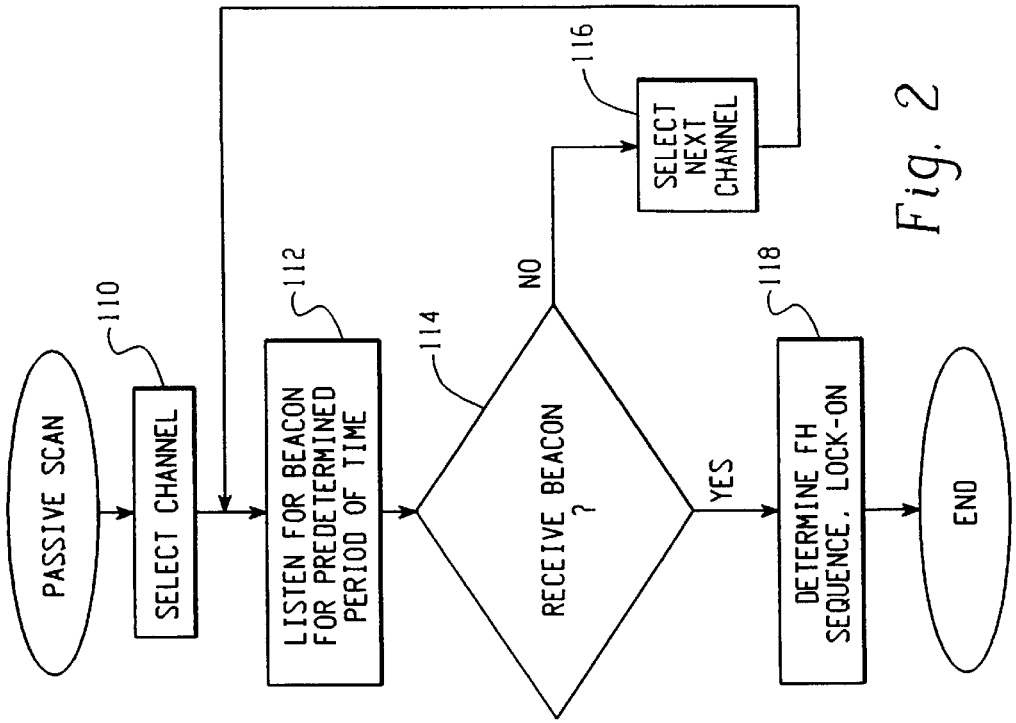
FIG. 2 is a flowchart describing passive scanning mode operation for locking on to a hopping sequence of a new base station.

The present invention will now be described with reference to the drawings wherein like reference numerals are used to refer to like elements throughout. As mentioned above, the present invention relates to cellular communication systems which include mobile devices that can roam from cell to cell. Such mobile devices can be data terminals, telephones, pagers, etc. In the exemplary embodiment described hereinafter, the mobile device is a mobile data terminal (hereinafter "mobile terminal") used to communicate data such as inventory or the like. However, it is recognized that the invention contemplates other types of mobile devices and is not intended to be limited to systems utilizing mobile terminals.

Figure 3:
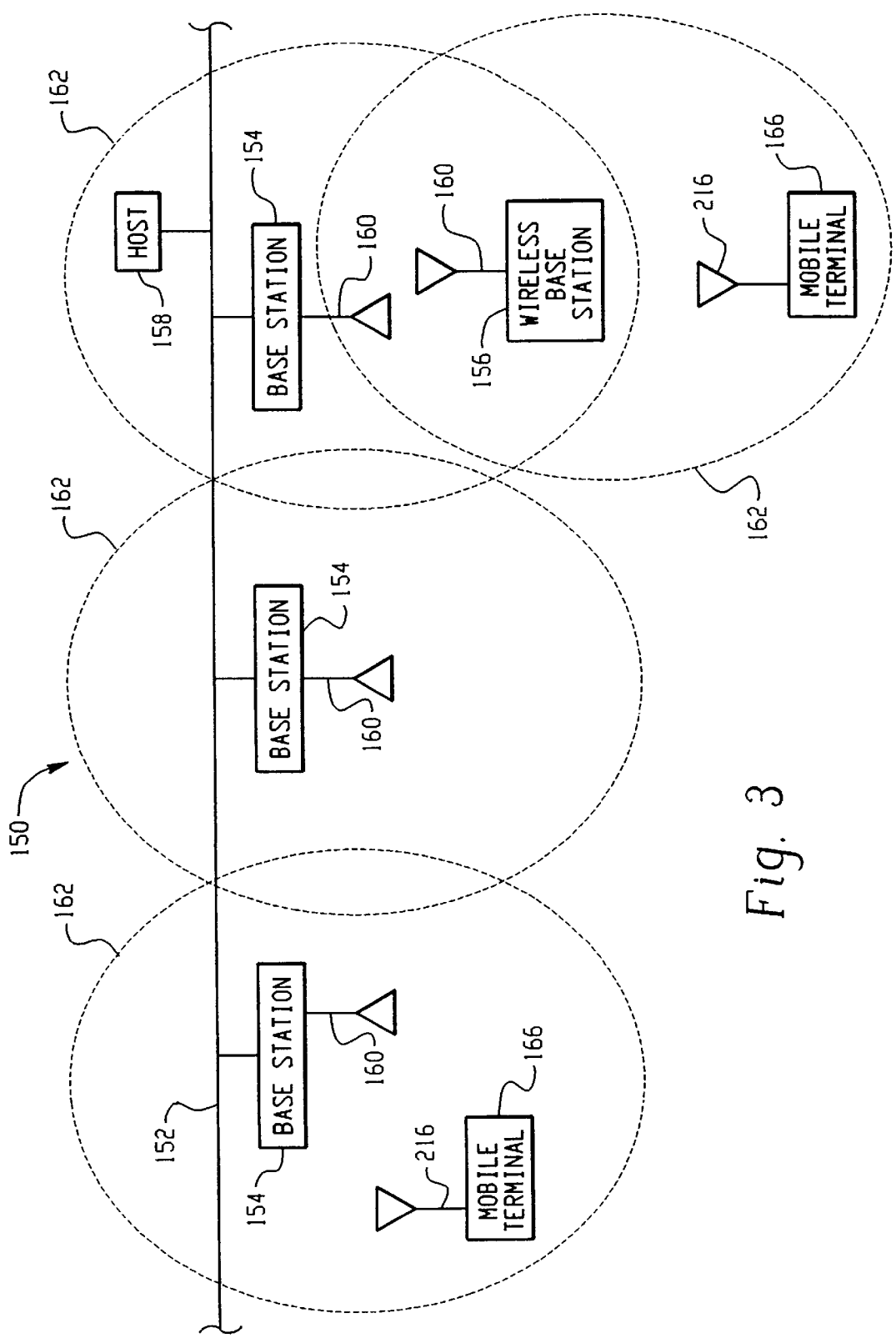
FIG. 3 is a schematic diagram of a cellular communication system in accordance with an example of the present invention.

Referring now to FIG. 3, a cellular communication system 150 is shown in accordance with the exemplary embodiment of the present invention. The cellular communication system 150 includes a network having a backbone 152. The backbone 152 may be a hardwired data communication path made of twisted pair cable, shielded coaxial cable or fiber optic cable, for example, or may be wireless in nature. Connected to the system backbone 152 are several base stations 154. Each base station 154 serves as an entrance point through which wireless communications may occur with the system backbone 152. Additionally, in order to expand the effective communication range of the base stations 154, one or more wireless base stations 156 are also included in the cellular communication system 150. As is conventional, each wireless base station 156 associates itself, typically by registration, with another base station, whether hardwired or wireless, such that a link is formed between itself and other devices situated on the system backbone 152. For example, in the system 150 shown in FIG. 3 a wireless base station 156 associates itself with one of the base stations 154 connected to the system backbone 152 so that a communication link is formed between the wireless base station 156 and a host computer 158 coupled to the system backbone 152. All communications between the wireless base station 156 and a device on the system backbone 152 are made possible by the other base stations on the link which are configured to relay communications therebetween.

Each base station 154, 156 is capable of wirelessly communicating with other devices in the system 150 via an antenna 160. A geographic cell 162 associated with each base station 154, 156 defines a region of coverage in which successful wireless communication may occur. Depending on the type of antenna 160 selected and output power of the respective base station, the cell 162 may take one of several different forms and sizes. For example, FIG. 3 depicts the base stations 154, 156 utilizing an omni-directional antenna wherein a generally spherical cell area of coverage is obtained. However, a directed yagi-type antenna or other form of antenna could also be used as will be readily appreciated.

The cellular communication system 150 also includes one or more mobile terminals 166. Each mobile terminal 166 communicates with devices on the system backbone 152 via a selected base station 154, 156 and/or with other mobile terminals 166. Upon roaming from one cell 162 to another, the mobile terminal 166 is configured to associate itself with a new base station 154, 156. As discussed above in the background section, in systems where each base station 154 communicates using a different frequency hopping sequence, there can be delay times associated with the mobile terminal roaming from one base station 154 to another base station 154. In a conventional system, such delay times stem from the time it takes the mobile terminal 166 to lock on to the hopping sequence of a new base station 154.

According to the present invention, however, such delay time is reduced substantially by providing a system in which each of the base stations 154, 156 communicates its own particular hopping sequence to the other base stations 154, 156 via the system backbone 152. The wireless base stations 156 are configured to adopt the hopping sequence of the base station 154 with which they are associated as discussed more fully below. Each of the base stations 154, 156 maintains in memory information in the form of a roaming table which includes hopping sequence and timing information relating to the other base stations 154, 156. Each mobile terminal 166 which registers with a base station 154, 156 receives therefrom information in the form of a reduced roaming table. The reduced roaming table is stored in memory within the mobile terminal 166 and, as described below, includes hopping sequence and timing information for the base stations 154, 156 which are adjacent to, or has overlapping cell area coverage with the base station with which the mobile terminal 166 is currently registered.

As is described more fully below, in the event a mobile terminal 166 begins to roam from one cell 162 to another, the mobile terminal 166 will look to the information in its reduced roaming table to determine the hopping sequences of the base stations 154, 156 which cover the cell 162 into which the mobile terminal 166 is likely to roam. Based on the hopping sequence and timing information, the mobile terminal 166 can jump immediately to the channel which the base stations 154, 156 are likely to be at and attempt to lock on using either passive or active scanning techniques. In this manner, the mobile terminal 166 can avoid the necessity of scanning through several different channels essentially at random before receiving a beacon or probe response packet allowing the mobile terminal 166 to lock on. Thus, the present invention significantly reduces the search time ordinarily associated with known active or passive modes of scanning as will be further appreciated based on the detailed description below.

FIG. 4 is a block diagram representative of each base station 154. Each base station 154 is connected to the system backbone 152 via a connector 170 such as a DB-9 or RJ-45 connector. The connector 170 is connected to the system backbone 152 at one end and to a network adapter transceiver 172 included in the base station 154 at the other end. The network adapter transceiver 172 is configured according to conventional network adapter transceiver techniques to allow the base station 154 to communicate over the system backbone 152. The network adapter transceiver 172 is also connected to an internal bus 174 included within the base station 154. The base station 154 further includes a processor 176 connected to the bus 174 for controlling and carrying out the operations of the base station 154. The processor 176 may include any of a variety of different microprocessors, such as the Motorola 68360 or Intel 80386 microprocessors.

The base station 154 also includes a memory 178 connected to the bus 174. The memory 178 stores program code executed by the processor 176 for controlling the other elements within the base station 154 to carry out the functions described herein. It will be readily apparent to a person having ordinary skill in the art of microprocessor programming how to program the processor 176 and the other elements within the base station 154 to carry out the operations described herein using conventional programming techniques based on the flowcharts and descriptions provided herein. As a result, additional detail as to the specific program code has been omitted. The memory 178 also serves to buffer packets of information such as those received over the system backbone 152 or those transmitted to or received from the mobile terminals 166 or wireless base stations 156. Moreover, the memory 178 functions to store the aforementioned roaming table which is maintained by the processor 176. The roaming table is discussed in more detail below in connection with FIG. 10. The memory 178 also functions to store a frequency hopping sequence table as described below in connection with FIG. 7, such table containing a list of all of the possible frequency hopping sequences which the devices within the system 150 are able to utilize.

Also connected to the bus 174 is a radio frequency (RF) section 180 included in the base station 154. The RF section 180 includes the aforementioned antenna 160 for receiving radio signals from and transmitting radio signals to mobile terminals 166 and wireless base stations 156 within the cell area 162 of the base station 154. Information transmitted from a mobile terminal 166 or a wireless base station 156 is received via the antenna 160 and is processed by an RF receiver 182 which demodulates and decodes the signal and converts the information to a digital signal having a packet format as discussed below in connection with FIG. 8. The processor 176 in the base station 154 inserts source routing information into the source routing field of the packet received from the mobile unit, if needed. Thereafter, the processor 176 stores the packet in the memory 178 until such time as the base station 154 transmits the information packet onto the system backbone 152 via the network adapter transceiver 172 and connector 170 or to another device in the system 150 via antenna 160.

Information packets which are transmitted to the base station 154 via the system backbone 152 for transmission to a mobile terminal 166 or wireless base station 156 are received by the network transceiver 172. The processor 176 controls an RF transmitter 184 included in the RF section 180, the RF transmitter 184 also being connected to the bus 174. The processor 176 causes the RF transmitter 184 to modulate and transmit an RF signal which in turn carries the information packet to the appropriate mobile terminal 166 or wireless base station 156.

The RF section 180 includes a frequency hopping (FH) modulating circuit 190 which controllably provides the hopping sequence employed by the RF transmitter 184 and RF receiver 182 for transmitting and receiving signals, respectively. The RF transmitter 184, RF receiver 182 and FH modulating circuit 190 are conventional in design and in the manner in which the transmitter and receiver hop through a sequence of carrier signal frequencies as controlled by the FH modulating circuit 190. Hopping sequence information is provided to the FH modulating circuit 190 from the processor 176 via the bus 174. The FH modulating circuit 190 is controllable in the sense that the FH modulating circuit 190 receives hopping sequence information from the processor 176 and provides output signals to the RF receiver 182 and RF transmitter 184 which determine the sequence of carrier frequencies thereof as the receiver and transmitter each hop through the sequence of channels.

Each base station 154 also includes an FH sequence counter 192 whose output is provided to the processor 176. The FH sequence counter 192 is a cyclical counter which continuously counts from 1 to N at the same rate at which the devices within the system 150 hop channels, and where N is the total number of channels in each hopping sequence utilized in the system 150. For example, as described below in relation to FIG. 7 each of the devices in the system 150 uses one of 78 different FH sequences with each sequence including 79 channels. The dwell time on each channel is 100 msec. Thus, in the exemplary embodiment, the FH sequence counter 192 continuously counts from 1 to 79 in cyclical fashion at a rate such that the counter is incremented every 100 msec. As is discussed below, the output of the FH sequence counter 192 provides a reference whereby the location of the other base stations 154, 156 in their respective hopping sequences can be determined at any given time.

Each base station 154 further includes a modulo counter 194 for providing timing information within each channel. Specifically, in the exemplary embodiment the counter 194 is reset to 0 by the processor 176 upon start up and begins counting at one millisecond increments. The output of the modulo counter 194 is represented by:

output=[value of the counter] mod [channel dwell time]

where mod represents the modulo operation.

Thus, in the case where the dwell time for each channel in the respective FH sequences is 100 msec, if the value of the counter 194 was 767 and the dwell time per channel was 100 msec, the output of the counter 194 would be 767 mod 100, or 67. As another example, if the dwell time were 200 msec then the output of the counter 194 would be 767 mod 200, or 167. Hence, if a channel dwell time is 100 msec, the output of the counter 194 will continuously cycle from 0 to 99 at 1 millisecond increments. If a channel dwell time is 200 milliseconds, the output of the counter 194 will continuously cycle from 0 to 199 at 1 millisecond increments. Accordingly, the combination of the FH sequence counter 192 and the counter 194 are able to provide a "time stamp" reference indicative of relative channel location as described more fully below. More accurate timing information may also be achieved by incrementing the modulo counter in microseconds or by other rates.

FIG. 5 is a block diagram representative of each wireless base station 156 in the system 150. For the most part, the construction and operation of the components within the wireless base station 156 are identical to that described with respect to the base stations 154. Hence, similar components are denoted simply by the addition of a "'". For example, the processor 176 in the base station 154 is equivalent to the processor 176' in the wireless base station 156. However, the wireless base station 156 is not connected directly to the system backbone 152 and therefore does not include a network transceiver 172 or connector 170 as in each base station 154. Rather, the wireless base station 156 communicates with mobile terminals 166 registered thereto and with the particular base station with which the wireless base station 156 is associated with via the RF section 180'. Operations of the two base stations 154 and 156 are primarily the same with the exception of the particular procedures described herein. As will be appreciated, the wireless base stations 156 function to extend the relative cell coverage of a given base station 154, and serve primarily to relay information between the base stations 154 connected to the system backbone 152 and the mobile terminals 166.

Figure 6:
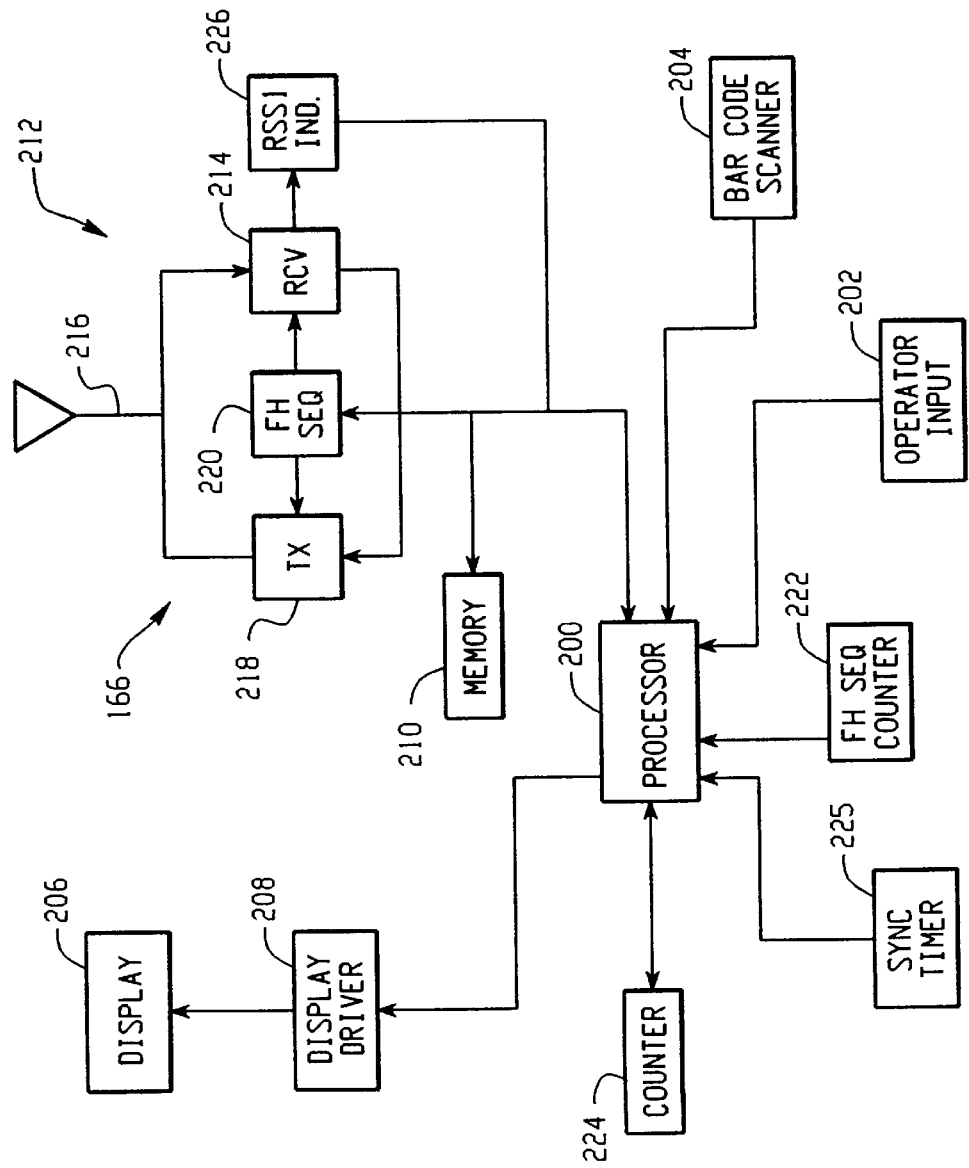
FIG. 6 is a block diagram of a mobile device in the form of a mobile terminal in accordance with the present invention.

FIG. 6 is a block diagram representing the basic structure of each mobile terminal 166 according to the exemplary embodiment. Each mobile terminal 166 includes a processor 200 which can be programmed to control and to operate the various components within the mobile terminal 166 in order to carry out the various functions described herein. The processor 200 has coupled thereto an operator input device 202 which allows an operator to input data to be communicated to the system backbone 152 such as inventory data, patient information, etc. This information may be sent to the host computer 158 which serves as a central data location, for example, or to a cash register connected to the system backbone 152, as another example, for providing price information. The input device 202 can include such items as a keypad, touch sensitive display, etc. The mobile terminal 166 also may include a bar code scanner 204 coupled to the processor 200 serving as another form of data input. A display 206 is connected to and controlled by the processor 200 via a display driver circuit 208. The display 206 serves as a means for displaying information stored within the mobile terminal 166 and/or received over the system backbone 152 via a base station 154, 156. The display 206 can be a flat panel liquid crystal display with alphanumeric capabilities, for example, or any other type of display as will be appreciated.

A memory 210 is included in each mobile terminal 106 for storing program code executed by the processor 170 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 210 also serves as a storage medium for storing information packets received from or intended to be transmitted to a base station 154, 156 as discussed herein.

Furthermore, the memory 210 stores a reduced roaming table which is generated based on information provided by the base station 154, 156 with which the mobile terminal 166 is registered. As discussed below with respect to FIG. 11, the reduced roaming table is maintained by the processor 200 in memory 210 and includes information regarding the particular hopping sequence and timing of the base stations 154, 156 likely to be in the vicinity of the mobile terminal 166. The memory 210 also functions to store a frequency hopping sequence table as described below in connection with FIG. 7, such table containing a list of all of the possible frequency hopping sequences which the devices within the system 150 are able to utilize.

Each mobile terminal 166 also includes its own RF section 212 connected to the processor 200. The RF section 212 includes an RF receiver 214 which receives RF transmissions from a base station 154, 156 via an antenna 216 and demodulates the signal to obtain the digital information modulated therein. The RF section 212 also includes an RF transmitter 218. In the event the mobile terminal 166 is to transmit information to the system backbone 152 in response to an operator input at input device 202, for example, the processor 200 forms within the memory 210 an information packet including data together with a source address (i.e., the address of the particular mobile terminal 166 sending the information) and a destination address (e.g., the host computer 158 or other network device. The information packet is then delivered to the RF transmitter 218 which transmits an RF signal with the information packet modulated thereon via the antenna 216 to the base station 154, 156 with which the mobile terminal 166 is registered.

Like the RF sections 180 and 180' in the base stations 154 and 156, respectively, the RF section 212 of the mobile terminal 166 includes a frequency hopping (FH) modulating circuit 220 which controllably provides the hopping sequence employed by the RF transmitter 218 and RF receiver 214 for transmitting and receiving signals, respectively. The RF transmitter 218, RF receiver 214 and FH modulating circuit 220 are conventional in design and in the manner in which the transmitter and receiver hop through a sequence of carrier signal frequencies as controlled by the FH modulating circuit 220. Hopping sequence information is provided to the FH modulating circuit 220 from the processor 200. The FH modulating circuit 220 is controllable in the sense that the FH modulating circuit 220 receives hopping sequence information from the processor 200 and provides output signals to the RF receiver 214 and RF transmitter 218 which determine the carrier frequencies thereof as the receiver and transmitter each hop through the sequence of channels.

Each mobile terminal 166 also includes an FH sequence counter 222, a modulo counter 224, and a sync timer 225 whose respective outputs are provided to the processor 200. The operation of the FH sequence counter 222 and modulo counter 224 is identical to that of the FH sequence counters 192, 192' and counters 194, 194', respectively, in the base stations 154, 156. Similarly, the operation of sync timer 225 is identical to that of the sync timers 290, 290' in the base stations 154, 156 which are described more fully below. In addition, the mobile terminals 166 each includes a received signal strength indicator (RSSI) circuit 226 which is coupled to the RF receiver 214 and produces a digital output indicative of the signal strength of signals received by the RF receiver 214. The output of the RSSI circuit 226 is coupled to the processor 200 and allows the processor to sample the RSSI signal when desired. The construction of the RSSI circuit 226 is conventional and can include, for example, an analog-to-digital converter (not shown).

As mentioned above, the respective memory in the base stations 154, 156 and the mobile terminals 166 each has a frequency hopping sequence table stored therein. FIG. 7 represents the contents of such table in the exemplary embodiment. The system 150 is designed such that the respective devices can select from three different sets (Set 1 thru Set 3) of predetermined frequency hopping sequences, with each set including twenty-six (A thru Z) different sequences. Each frequency hopping sequence stored in the table represents a unique pseudo-random hop sequence with each sequence consisting of a sequence of 79 different hopping frequencies or channels. As will be appreciated, the particular sequences and/or the length of the sequences is not critical to the invention. According to the nomenclature utilized in FIG. 7, each hopping sequence can be identified by a set number (e.g., Set 1 thru Set 3) and a pattern label (e.g., Pattern A thru Pattern Z). Thus, each hopping sequence can be identified nominally as $f_{set,pattern}$, where $f_{set,pattern}$ is made up of a sequence of seventy-nine channels represented, in order, by $f_{set,pattern,1}$, $f_{set,pattern,2}$, . . . , $f_{set,pattern,79}$. The hopping sequences represented in the hopping sequence tables are utilized by the processors in the base stations 154, 156 and mobile terminals to control their respective FH modulating circuit (190,190', 220).

Referring briefly to FIG. 8, an exemplary format for packets sent between devices in the system 150 is shown. Each packet includes a number of fields such as a synchronization field 250, a header field 251, a source address field 252, a destination address field 253, a data field 254, and an error correcting field 256, for example. The synchronization field 250 includes synchronizing bits which allow a device receiving the packet an opportunity to "sync" to the packet as is conventional. The header field 251 follows the synchronization field 250 and includes information such as the length and type of the packet. For example, the header field 251 may indicate whether the packet is a type which requires a response from the receiving device. The source address field 252 follows the header field 251 and includes the address of the device from which the packet originated. Following the source address field 252, the packet includes a destination address field 253 which holds the address of the device to which the packet is ultimately destined. The data field 254 in the packet includes various information intended to be communicated to the receiving device. The packet ends with a cyclical redundancy code (CRC) field 256 which serves as an error correcting field according to conventional techniques such that a receiving device can determine if it has properly received the packet. The particular packet format may vary from system to system, and FIG. 8 is intended merely to be exemplary.

In accordance with the preferred embodiment, the base stations 154, 156 exchange information over the system backbone 152 regarding the particular hopping sequence being utilized and corresponding timing information. As discussed in more detail below, the base stations 154, 156 exchange entry response packets 280 including such information as represented in FIG. 9. More specifically, the data field 254 in each packet 280 includes a sequence information field 282, a time stamp field 284, an optional beacon interval field 286 and an optional test pattern interval field 288. The sequence information field 282 includes information referring to the particular hopping sequence in the frequency hopping sequence table (FIG. 7) that currently is being used by the base station 154, 156 transmitting the entry response packet 280. Such information is indicated nominally, at least, by set number and pattern label in correspondence with in FIG. 7. Accordingly, a base station using the hopping sequence consisting of the channel sequence $f_{2B1}$, $f_{2B2}$, . . . , $f_{2B79}$ would include information identifying $f_{2B}$ in the sequence information field 282. Such information can be in the format [set; pattern], or [Set 2, Pattern B].

The time stamp field 284 includes information indicative of the particular channel in the hopping sequence which the base station 154, 156 currently is at during the time which the base station transmits the entry response packet 280. Such channel information is represented in the preferred embodiment by the position number of the channel in the sequence. For example, if a base station is currently using the hopping sequence $f_{2B}$ and, at the time of transmitting the packet 280, is transmitting on channel $f_{2B37}$, the information placed in the time stamp field 284 would indicate the channel number in the format [channel number], or [37].

In another embodiment as discussed below, the time stamp field 284 also includes an indication in milliseconds of the point in the current channel the base station 154, 156 is at when the packet 280 is transmitted. As an example, in the case where the channel dwell time within the system is 100 msec, the base station remains on each channel in the sequence for $T_{dwell}$=100 msec, or from $t_{dwell}$=0 to $t_{dwell}$=99 msec. A sync timer 290, 290' (FIGS. 4 and 5) included in the base stations 154, 158 is provided so as to operate in synchronization with the channel hopping sequence so as to provide an output to the processor 176, 176' indicating the point in time in each channel the base station is currently at for any given moment. The output of the sync timer 290, 290' is $t_{dwell}$ where $t_{dwell}$=0 at the beginning of each channel in the sequence and is incremented every millisecond so as to go from $t_{dwell}$=0 to $t_{dwell}$=99 before returning to $t_{dwell}$=0 at the beginning of the next channel in the hopping sequence. Since the processor 176, 176' controls the hopping of the respective RF section and the processor receives the output of the timer 290, 290', the processor 176, 176' will always be able to determine exactly what channel the RF section is currently at in the hopping sequence and at what point into the dwell time the RF section is for that particular channel (within 1 msec). Accordingly, the processor can be programmed easily to include such information in the time stamp field 284. The information can be in the format [channel number; $t_{dwell}$(msec)], for example. Thus, if the packet 280 is transmitted in the middle of the 26th hop in the hopping sequence, the information in the time stamp field 284 can be represented by [26; 50].

The beacon interval field 286 and test pattern interval field 288 may be utilized in an embodiment in which the time stamp field 284 includes $t_{dwell}$ information. The beacon interval field 286 includes information indicative of how often and when beacon packets will be transmitted by the particular base station 154, 156 sending the packet 280 via its RF section in the event a passive scanning mode is employed as discussed below. Typically, a base station will transmit beacon packets a predetermined number of times per channel, the beacon packets being equally spaced apart. For example, the base station 154, 156 may be preprogrammed to transmit beacons twice per channel, and specifically at the beginning and middle of each channel. Accordingly, the information in the beacon interval field 286 may indicate a "beacon rate"=2 beacons per channel, such beacons occurring at $t_{dwell}$=0 and 50 (in the case where the total dwell time on each channel is 100 msec). The information in the beacon interval field 286 can be, for example, in the format [number of beacons per channel; $t_{dwell}$ times at which beacons occur]. In the above example, the beacon interval field 286 would contain [2; 0, 50]. Preferably, however, the information in the beacon interval field 286 would take the alternative format [number of beacons per channel; $t_{dwell}$ time of first beacon]. In the alternative embodiment it is assumed to be known that all beacons occur at evenly spaced intervals and thus may reduce the need for an additional field. Further, the alternative embodiment allows the information to be passed in fields having a constant length which helps reduce the RF bandwidth needed to transmit the information. Such information is useful so that if a mobile terminal 166 is passively scanning for a new base station, it knows when to expect a beacon and can "look" for a beacon packet at that particular time to lock-on to the new hopping sequence as is described further below.

The test pattern interval field 288 includes information indicating when and how often the particular base station 154, 156 sending the packet 280 transmits a test pattern packet via its RF section. As is conventional, a test pattern packet is a packet containing known data which allows a mobile terminal 166 to receive the packet and measure the signal quality of transmissions between the base station 154, 156 and the mobile terminal 166. As described below in connection with FIGS. 15A–15B, the mobile terminals 166 use the test pattern packets to determine when to begin scanning for a new base station and, if already scanning, to help determine if a selected new base station provides better signal quality than the previous base station.

Test pattern packets typically are not transmitted by a base station 154, 156 on every channel in the hopping sequence, but rather are transmitted at intervals which exceed the dwell time on each channel. For example, a test pattern packet typically may be transmitted by a base station 154, 156 once every predetermined number of hops, such as in the middle of every third hop in the hopping sequence. Accordingly, the information in the test pattern interval field 288 may be in the format of the number of hops per test pattern packet together with an offset reference indicative of when the next test pattern packet will be transmitted relative to the time stamp information included in the time stamp field 284, or [number of hops; offset]. The processor 176, 176' in the base station 154, 156 is programmed to calculate the offset (in msec) between where in the given channel the RF section currently is (i.e., the value of $t_{dwell}$) when transmitting the packet 280, and the time at which the next test pattern packet is to be transmitted. Since the processor 176, 176' is programmed to control such operations, the processor 176, 176' will have knowledge of such information and can be programmed to perform such computation.

For example, assume the case where a base station 154, 156 is programmed to transmit a test pattern packet in the middle of every third hop with a channel dwell time of $T_{dwell}$=100 msec. If the base station 154, 156 is currently at the beginning of the first of every three hops (where $t_{dwell}$=0), the next test pattern packet would be transmitted after 250 msec (corresponding to the middle of the third hop). Hence, the offset value is calculated by the processor 176, 176' to be 250. In such instance, the test packet interval field 288 would contain the information [3; 250]. As another example, a base station may be programmed to transmit a test pattern packet one-quarter way ($t_{dwell}$=25) through every fifth hop in the hopping sequence. Assuming, for example, that the base station is currently in the middle ($t_{dwell}$=50) of the second hop out of every fifth when transmitting the packet 280, the offset will be [((4*100)+25)−((1*100)+50))]=275. Accordingly, the test packet interval field 288 would contain the information [5; 275].

Figure 10:
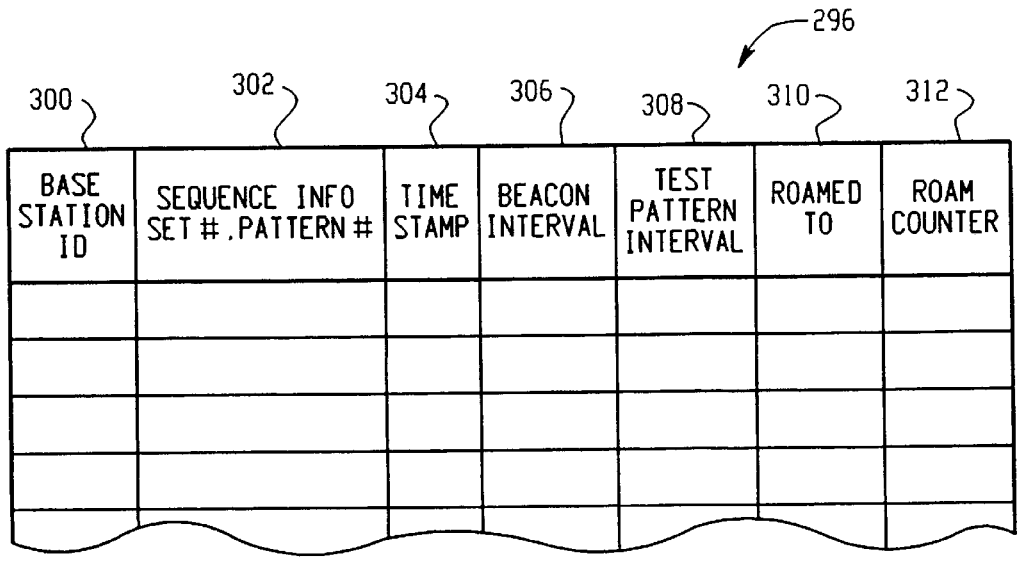
FIG. 10 is a schematic diagram of a roaming table which is maintained in memory in each base station in accordance with the present invention.

FIG. 10 shows the manner in which each base station 154, 156 stores the information contained in the entry response packets as received various other base stations in a roaming table 296 in its respective memory 178, 178'. Each entry is represented by a row in the table 296 and corresponds to a respective base station in the system 150. As shown in FIG. 10, each entry includes a base station identification address 300, a hopping sequence 302, a time stamp 304, an optional beacon interval 306 and test pattern interval 308, a roamed to indicator 310, and a roam counter value 312. The base station identification address 300 is in the format [base station ID] and indicates the network address of the base station 154, 156 which sent the entry response packet 280 used to create the entry. The processor 176, 176' extracts such information from the source address field 252 in the entry response packet 280.

The hopping sequence 302 corresponds to the hopping sequence information included in the sequence information field 282 of the packet 280, and refers to the particular hopping sequence being utilized by the base station transmitting the packet 280. Such information is similarly stored in the roaming table 296 in the format [set; pattern]. The time stamp 304 includes, at least initially as described below, the information in the time stamp field 284 of the entry response packet 280. Depending on the embodiment, the time stamp 304 will include either the channel information (e.g., [channel number]), or the channel information and channel position information (e.g., [channel number; $t_{dwell}$]). In addition, however, the time stamp 304 also includes a time tag $t_{ref}$ which provides a reference as to the value of the FH sequence counter 192 alone, or the values of the counter 192 and counter 194, depending on the embodiment, at the time which the entry response packet 280 was received by the base station 154, 156.

More specifically, the processor 176, 176' in the particular base station 154, 156 receiving an entry response packet 280 is programmed to sample the output of the FH sequence counter 192 alone or together with the output of the counter 194 at the time of receiving the packet 280. The outputs are then combined to form the time tag $t_{ref}$ in the form [counter 192; counter 194]. For example, if the value of the FH sequence counter 192 is 46 and the value of the counter 194 is 33 when the packet 280 is received, $t_{ref}$=[46; 33]. The time tag $t_{ref}$ is appended to the information provided in the time stamp field 284 so as to form a time stamp 304 having the format [channel number; $t_{ref}$] or [channel number; $t_{dwell}$; $t_{ref}$], depending on the embodiment. As is described below in more detail, the time tag $t_{ref}$ provides a reference whereby the base station can compute at a later time where in its respective hopping sequence a base station included in the roaming table 296 should be by comparing the time tag $t_{ref}$ with the value of the FH sequence counter 192 and counter 194 which run continuously as noted above.

The beacon interval field 306 includes the information received in the beacon interval field 286 of the entry response packet 280, namely information in the format [number of beacons per channel; $t_{dwell}$ times at which beacons occur]. The test pattern interval field 308 includes the information received in the test pattern interval field 288 of the entry response packet 280. More specifically, the test pattern interval 308 includes the information in the format [number of hops; offset].

The roamed to indicator 310 contains a flag bit which is set to indicate whether a mobile terminal 166 which was registered with the base station in which the roaming table 280 is being maintained has roamed to the base station which corresponds to the entry over the last 24 hours, for example. Thus, if the flag bit is set in the roamed to indicator 310 in any given entry, this indicates that a mobile terminal has roamed thereto in the last 24 hours from the base station in which the roaming table is maintained. The processor 176, 176' is programmed to maintain this information based on registration packets received from other base stations via the system backbone 152. Such packets indicate that a mobile terminal 166 which was previously registered to the base station has recently registered with one of the other base stations, as discussed below in connection with FIG. 13. If a registration packet is not received from 10 one of the base stations in the roaming table for over 24 hours, the processor 176, 176' is programmed to reset the flag bit in the corresponding roamed to indicator 310. As will be appreciated, the roamed to is a useful indication of which base stations 154, 156 the mobile terminals 166 previously registered to the present base station had a tendency to move on to. This information is helpful in determining which base stations a mobile terminal 166 should attempt to register with when seeking a new base station as discussed below with respect to FIG. 17. Generally speaking, the fact that a mobile terminal 166 has roamed to a particular base station in the last 24 hours (or other predetermined period of time) can be indicative of a higher probability that a mobile terminal 166 will roam to that base station in the future.

The roam counter value 312 in the roaming table 296 represents the number of mobile terminals 166 which were previously registered to the present base station 154, 156 maintaining the roaming table 296, and have newly registered with a base station corresponding to the particular entry in the roaming table 296 over the last hour, for example. The processor 176, 176' is programmed to maintain this information based on the registration packets received from other base stations via the system backbone 152 as discussed below in connection with FIG. 13. If a registration packet is received indicating that a mobile terminal 166 previously registered to the present base station has now registered with a new base station, the processor 176, 176' is programmed to increment by one the roam counter value 312 for the corresponding entry. At the same time, the processor 176, 176' is programmed to maintain the count so as to reflect only the number of mobile terminals which have roamed over the last one hour (or other predetermined time period). The roam counter value 312 is a useful indication of which base stations 154, 156 the mobile terminals 166 which had previously be registered to the present base station have a tendency to move on to. This information is also helpful in determining which base stations a mobile terminal 166 should attempt to register with when seeking a new base station as discussed below with respect to FIG. 17. Generally speaking, the fact that there has recently been a large number of mobile terminals 166 roaming to a particular base station can be indicative of a higher probability that a mobile terminal 166 will roam to that base station in the future. A similar analysis could alternatively be based on the average number of roams that occurred over a selected period of time.

Figure 11:
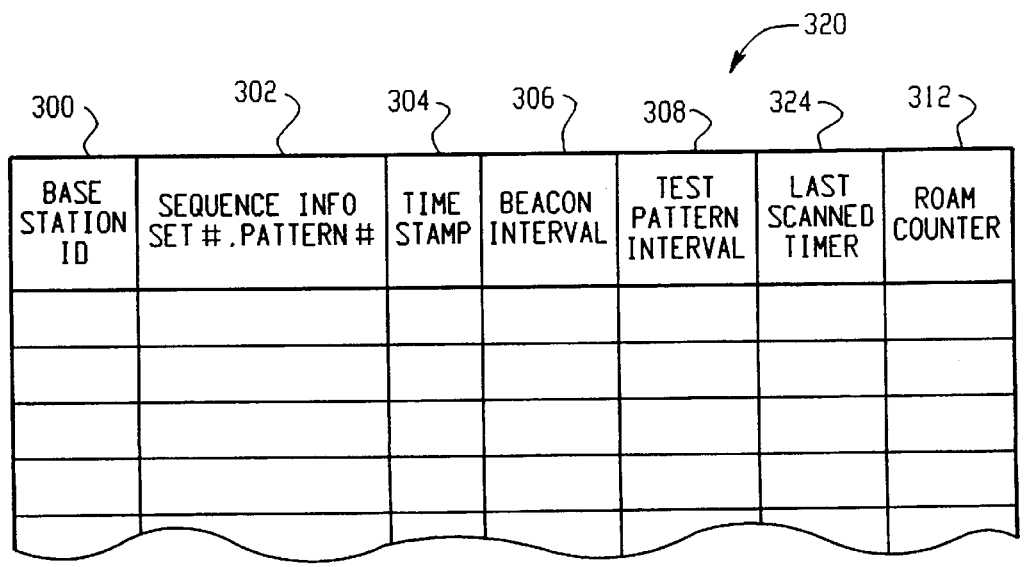
FIG. 11 is a schematic diagram of a reduced roaming table which is maintained in memory in each mobile terminal in accordance with the present invention.

Referring now to FIG. 11, the general format is shown for a reduced roaming table 320 which is stored in the memory 210 of each mobile terminal 166. The contents of the reduced roaming table 320 are based on information included in the roaming table 296 of the base station 154, 156 with which the mobile terminal 166 is currently registered as indicated above. The reduced roaming table 320 is similar to the roaming table 296 in that each entry is represented by a row in the table 320 and corresponds to a respective base station in the system 150. Unlike the roaming tables 296 in each base station, however, the reduced roaming table 320 does not include an entry for every base station in the system. Rather, the reduced roaming table 320 only includes entries for those base stations which are predetermined likely to be new base stations with which the mobile terminal 166 may register as determined in the manner described below.

As shown in FIG. 11, each entry includes a base station identification address 300 and a hopping sequence 302 identical to that included in the roaming table 296. The time stamp 304 has the same format as the time stamp in the roaming table 296; however, the information is updated to reflect the hopping sequence position at the time the time stamp information is sent to the mobile terminal 166 as described below. The beacon interval field 306 is identical to that stored in the roaming table 296. The test pattern interval field 308 is in the same format as the test pattern interval in the roaming table 296; however the information therein is updated to reflect the offset at the time the test pattern interval information is sent to the mobile terminal 166 as is also described below. The information in the roam counter 312 is identical to the roam counter 312 in the roaming table 296 and is updated each time the mobile terminal 166 receives a roaming table update packet as described in more detail below.

Unlike the roaming table 296, the reduced roaming table 320 does not include a roamed to indicator 310. On the other hand, the reduced roaming table 320 does include a last scanned indicator 324 which is maintained by the processor 200 in each mobile terminal 166. The processor 200 is preprogrammed to keep track of how much time has passed since the mobile terminal 166 has attempted to lock onto the hopping sequence of the associated base station 154, 156. This can be done using conventional timing techniques such as a timer incorporated within the mobile terminal 166. Such information is utilized by the mobile terminal 166 in order to prioritize which new base stations 154, 156 the mobile terminal should attempt to lock onto initially as discussed below in connection with FIG. 17.

Figure 12:
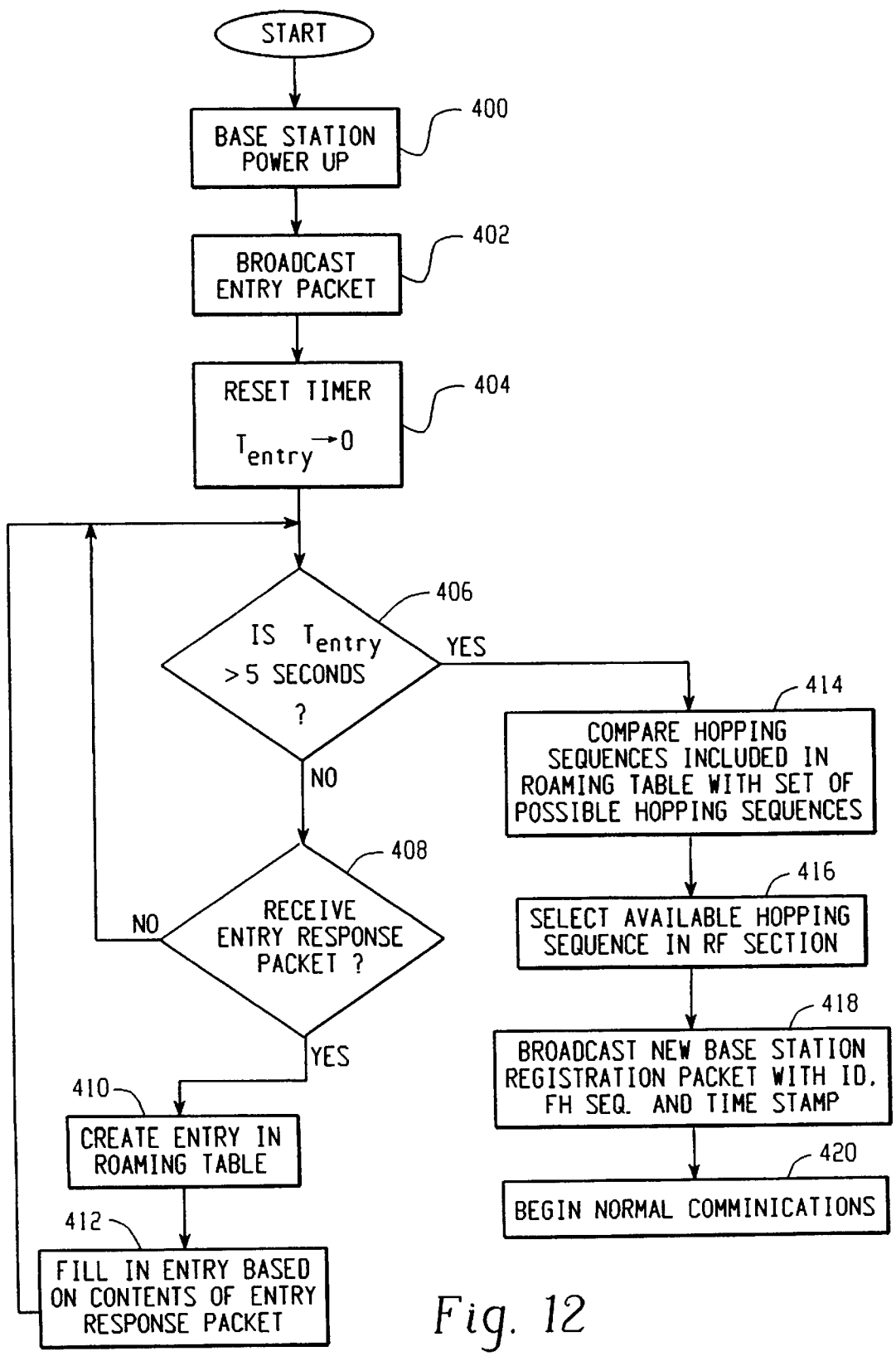
FIG. 12 is a flowchart representing the operation of a base station when selecting a hopping sequence and constructing a roaming table upon powering up in accordance with the present invention.

Referring now to FIG. 12, the procedure according to which each base station 154 may enter the system 150 is shown. After a base station 154 has been connected to the system backbone 152, the base station 154 is powered up initially as represented in step 400. Such powering up can be as a result of turning on a switch, plugging in a base station power cord to a power source, etc. After powering up and upon completing any self-initialization routines, the processor 176 is programmed to generate and broadcast an "entry" packet to any base stations 154, 156 in the system 150 as represented in step 402. Such entry packet is received by each base station 154 directly via the system backbone 152, and each wireless base station 156 receives such broadcast packet via the base station 154 with which it is associated.

The entry packet which is broadcast in step 402 includes in its source address field 252 the address of the particular base station 154 which has recently powered up. The data field 254 includes information identifying the base station 154 as having entered the system 150 and requesting that other base stations 154, 156 in the system 150 reply with an entry response packet 280 in the format shown in FIG. 9. The newly entered base station 154 then waits to receive the entry response packets 280 in order to construct its own roaming table 296 in memory 178.

More specifically, in step 404 the processor 176 resets a continuous timer $T_{entry}$ to zero. Next, in step 406 the processor 176 checks whether $T_{entry}$ is greater than a predetermined period of time (e.g., 5 seconds). If not, the processor 176 proceeds to step 408 in which it determines whether the base station 154 has received an entry response packet 280 from any other base stations 154, 156. In the event an entry response packet 280 has been received, the processor 176 proceeds to step 410 in which it creates a corresponding entry in its roaming table 296. Specifically, for each entry response packet 280 the processor 176 creates a row in the roaming table 296. Next, in step 412 the processor 176 fills in the entry based on the contents of the entry response packet 280. The base station identification address 300 includes the network address of the responding base station as taken from the source address field 252 of the entry response packet 280. The hopping sequence 302, beacon interval 306 and test pattern interval 308 information is taken directly from the corresponding fields 282, 286 and 288 in the entry response packet 280. The time stamp information in the time stamp 284 of the entry response packet 280 is placed in the time stamp 304 of the roaming table 296. In addition, however, the processor 176 is programmed to add the aforementioned time tag $t_{ref}$ which is represented by the value of the FH sequence counter 192 alone or in combination with the value of the counter 194 at the time the entry response packet 280 is received.

Following step 412, the processor 176 returns to step 406. Similarly, if in step 408 an entry response packet has not been received the processor 176 returns to step 406. In either case the processor 176 again checks whether $T_{entry}$ is greater than 5 seconds. If not, steps 408–412 are repeated. Accordingly, for a predetermined time after broadcasting an entry packet the base station 154 waits to receive any entry response packets 280. With respect to any entry response packets which are received during such time, an entry is created in the roaming table 296 of the base station 154. Preferably, the time period in step 406 is sufficient that all entry response packets 280 from any base stations 154, 156 will have been received. Entry response packets 280 provided from base stations 154 are provided directly via the system backbone 152. Entry response packets from the wireless base stations 156 are first communicated to the base station 154 with which the wireless base station is associated, and the packet is then forwarded to the requesting base station 154 via the system backbone 152.

When $T_{entry}$ is greater than the predetermined time (e.g., 5 sec) as determined in step 406, the processor 176 proceeds to step 414 in which the base station 154 performs the process of selecting its own unique hopping sequence from those available within the system 150. Specifically, the processor 176 evaluates the hopping sequence information provided in the hopping sequence entries 302 to determine what particular hopping sequences are being used by the other base stations 154, 156 in the system 150. As noted above, each base station 154 will be using its own unique hopping sequence and the wireless base stations 156 will be using the hopping sequence of the base station 154 with which it is associated.

In step 414, the processor 176 compares the particular hopping sequences being used by the other base stations 154, 156 with the possible hopping sequences in the system 150 as identified in the frequency hopping sequence table (FIG. 7) stored in memory 178. Next, in step 416, the processor 176 is programmed so as to select any one of the hopping sequences included in the frequency hopping sequence table which is not being used by any of the other base stations 154, 156 as identified in the hopping sequence entries 302. The selected hopping sequence then becomes the hopping sequence for that particular base station 154. The processor 176 then sets the FH modulating circuit 190 (FIG. 4) in the RF section 180 such that the base station 154 is configured to transmit and receive radio transmissions using the hopping sequence selected in step 416.

Following step 416, the processor 176 proceeds to step 418 in which it generates a "new base station registration" packet. The new base station registration packet includes in its source address field 252 the network address of the base station 154. In its data field 254, the new base station registration packet includes the hopping sequence [set; pattern] selected by the base station 154 in step 416. The data field 254 also includes a time stamp (e.g., [channel number] or [channel number; $t_{dwell}$]). Similar to the time stamp 284 discussed above in relation to the entry response packet 280 (FIG. 9), the time stamp in the new base station registration packet represents the particular channel number in the hopping sequence which the base station 154 is currently at when transmitting the packet. In an embodiment using $t_{dwell}$, this represents the particular point in the current channel the base station 154 is at when the packet is transmitted. The processor 176 is programmed to ascertain such information and include it in the new base station registration packet. Such information is obtainable since the processor 176 controls the hopping sequence timing and receives the output of the timer 290 as described above. The processor 176 causes the new base station registration packet to be transmitted to all of the base stations 154, 156 identified in its roaming table 296 in step 418. Following step 418, the processor 176 proceeds to step 420 in which the base station 154 then begins normal communications within the system 150 (e.g., relating to inventory tracking, patient information, etc.).

Unlike base stations 154, the wireless base stations 156 do not utilize a unique hopping sequence as previously mentioned. Rather, the wireless base stations 156 must register with another base station 154 directly or via another wireless base station 156 which provides an access path to the system backbone 152. Therefore, in order for communication to occur the wireless base stations 156 must adopt the hopping sequence of the base station 154, 156 with which it registers. In the preferred embodiment, upon powering up a wireless base station 156 performs what is conventionally known as an exhaustive scan in order to determine all possible base stations 154, 156 to which it may register. An exhaustive scan, which is known to those having ordinary skill in the art, is one in which scanning for a possible base station continues even after a possible base station is found in order to determine if there are other possible base stations 154, 156 with which may provide for better system performance. Thus, exhaustive scans typically provide that the wireless base station 156 actively or passively scans all channels for a predetermined period of time wherein the predetermined period of time is long enough to give a very high probability of finding all possible base stations available. Following the exhaustive scan, the wireless base station 156 selects the base station 154, 156 which provides the best system performance based on conventional criteria such as signal quality, traffic load, and the number of system hops needed to reach the system backbone 152. The wireless base station adopts the hopping sequence of the selected base station and proceeds to register therewith using conventional techniques.

Upon registering with a particular base station 154, 156, the wireless base station 156 transmits a request to the base station 154, 156 with which it is registered prompting it to send the contents of its roaming table 296. The base station 154, 156 with which the wireless base station 156 has just registered in turn transmits the contents of its roaming table 296 to the wireless base station 156 such that the contents of the roaming table 296 in each of the base stations 154, 156 are substantially identical. However, as described below in the context of when a base station 154, 156 transmits information for forming a reduced roaming table 320 to a mobile terminal 166, the contents of the roaming table as transmitted are updated to reflect the hopping sequence timing information for the various base stations at the time the information is transmitted. The wireless base station 156 then broadcasts its own new base station registration packet to all of the other base stations 154, 156 in the system 150. The new base station registration packet has the same format at those sent by the base stations 154 as discussed above in connection with FIG. 12, step 418. The other base stations 154, 156 then use the information in the new base station registration packet to create an entry in their respective roaming tables 296 corresponding to the newly introduced wireless base station 156.

In another embodiment, upon receiving the roaming table information from the base station with which it has registered, the wireless base station 156 uses the information to search for a new base station which provides even better performance in the same manner described below with respect to the mobile terminals 166 and a priority fast scan. This way, in the event a base station 154, 156 was inadvertently not detected by the wireless base station 156 during its exhaustive scan the wireless base station can quickly search for such a base station. In the event a better base station is found, the wireless base station registers with the new base station 154, 156. The wireless base station 156 then broadcasts another new base station registration packet to inform the other base stations of its new hopping sequence, etc.

As will be appreciated based on the description herein, there are many instances when timing information stored in a roaming table 296 needs to be transmitted to a mobile terminal 166 or wireless base station 156. It is important that the timing information as transmitted be indicative of the current hopping information for each of the base stations 154, 156 involved. Consequently, whenever a base station 154, 156 transmits timing information to a mobile terminal 166 (or wireless base station 156) it must first translate the information (with respect to time) to take into account the fact that the base stations identified in the roaming table 296 have undergone most probably numerous hops since the information was initially stored therein. Hence, each of the processors 176,176' are programmed to perform the following time translation based on the time tag $t_{ref}$ in the time stamp 304 in the roaming table 296:

(1) When transmitting information relating to a base station identification address 300, a hopping sequence 302, a beacon interval 306, or a roam counter 312 no time translation is performed because such information is independent of time as will be appreciated;

(2) When transmitting information relating to a time stamp 304, the processor 176,176' is programmed to sample the output of the counter 192 or the counter 192 and the counter 194, depending on the embodiment, at the time the time stamp 304 is being transmitted to the mobile terminal 166 or wireless base station 156. The processor 176,176' then applies those values to the following equations in order to obtain the current channel number ([channel number]$_{current}$) and dwell time ($[t_{dwellcurrent}]$) of the base station being represented:

for [channel number]$_{current}$:

let X=(Counter $192_{current}$−Counter $192_{ref}$)+channel number where Counter $192_{current}$ is equal to the current value of the Counter 192 at the time the time stamp 304 is being transmitted; Counter $192_{ref}$ is equal to the value of the Counter 192 in the time tag $t_{ref}$; and HOPS is equal to the total number of channels in the hopping sequence.

IF 0≦X≦HOPS then
 [channel number]$_{current}$=X
IF X>HOPS then
 [channel number]$_{current}$=(X) MOD (HOPS)
IF X<0 then
 [channel number]$_{current}$=X+HOPS for [$t_{dwell}$]$_{current}$:

Let Y=(Counter $194_{current}$−Counter $194_{ref}$)+$t_{dwell}$ where Counter $194_{current}$ is equal to the current value of the Counter 194 at the time the time stamp 304 is being transmitted; Counter $194_{ref}$ is equal to the value of the Counter 194 in the time tag $t_{ref}$; and DWELL is equal to the total dwell time per channel.

IF 0≦Y≦DWELL then
 [$t_{dwell}$]$_{current}$=Y
IF Y>DWELL then
 [$t_{dwell}$]$_{current}$=(Y) MOD (DWELL)

IF Y<0 then
    $(t_{dwell})_{current}$=Y+DWELL where MOD represents the modulo operation and where [channel number]$_{current}$ and [$t_{dwell}$]$_{current}$ represent the translated time stamp information [channel number; $t_{dwell}$] transmitted to the mobile terminal or wireless base station. As will be appreciated, such information represents the current channel number and dwell time of the base station associated therewith at the time the information is transmitted to the mobile terminal 166 or wireless base station 156. The mobile terminal 166 or wireless base station 156 then stores the information in its roaming table 320 or 296 together with a new time tag $t_{ref}$ based on the outputs of its time stamp information is received; and (3) When transmitting information relating to a test pattern interval 308, the processor 176,176' is programmed to sample the output of the counter 192, 192' or the counter 192, 192' and the counter 194, 194' depending on the embodiment, at the time the test pattern interval 308 is being transmitted to the mobile terminal 166 or wireless base station 156. The processor 176,176' then applies those values to the following equation in order to obtain the current offset ([offset]$_{new}$) for the test pattern interval of the base station being represented (the number of hops identified in the test pattern interval will not change as will be appreciated). Note that the equations below represent an embodiment where dwell times utilized by each base station are the same, however, minor modifications of these equations can be made to account for differing dwell times as can readily be appreciated by those in the art:

[offset]$_{new}$=

I. If HOPS MOD (number of hops)=0 then
  LET:
    A=(Counter 192$_{ref}$*DWELL)+Counter 194$_{ref}$+offset
    B=number of hops*DWELL
    C=A MOD B
    D=(Counter 192$_{current}$*DWELL)+Counter 194$_{current}$
    E=D MOD B
  Then:
    if C<E
      [offset]$_{new}$=B−E+C
    if C≧E
      [offset]$_{new}$=C−E II. If HOPS MOD (number of hops)<>0 then
  Let a counter "Count1" in memory 178, 178' of processor 176,176' be a cyclical counter beginning at 1 and counting cyclically to number of hops. The counter Count1 cyclically advances by one each time the Counter 192$_{current}$ is equal to one.
  Let F=C−[(Count1−1)*DWELL]
  If F>0 then
    Let C=F and make all other calculations in accordance with that shown above in I.
  If F≦0 then
    Let C=C+(number of hops*DWELL) and make all other calculations in accordance with that shown above in I;
    where [offset]$_{new}$ represents the translated offset information for the test pattern interval information transmitted to the mobile terminal. As will be appreciated, such information represents the offset indicating when the next test pattern will occur in relation to the time at which the information is transmitted to the mobile terminal 166 or wireless base station 156.

Figure 13:
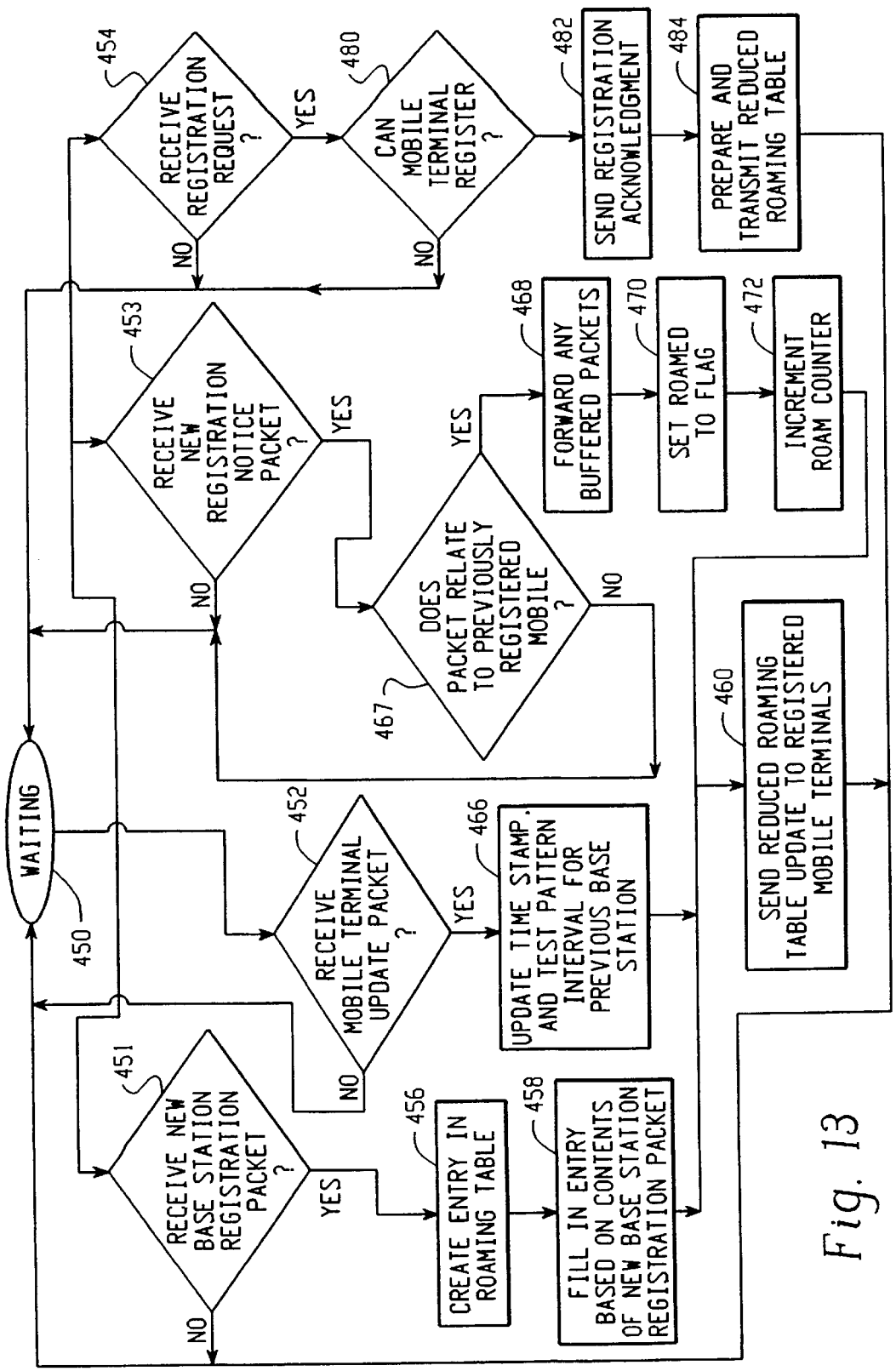
FIG. 13 is a flowchart representing the operation of a base station for maintaining the information stored in its roaming table in accordance with the present invention.

Turning now to FIG. 13, the general sequence of operations for each base station 154, 156 is shown in relation to roaming table operations. The processor 176, 176' in each base station 154, 156 is programmed to carry out the operations shown in FIG. 13 continuously as part of overall management operations while at the same time carrying out normal communications. The processor 176,176' normally resides in step 450 waiting for an event to happen as determined in any of steps 451–454. For example, in step 451 the processor 176,176' determines if a new base station registration packet has been received indicating that a new base station 154, 156 has become part of the system as exemplified in step 418 of FIG. 12. If yes, the processor 176,176' creates a new entry in its roaming table 296 as represented in step 456. Such entry is formed in a manner analogous to the creation of an entry as described with respect to step 410 in FIG. 12. Thereafter, the processor 176, 176' fills in the information for that entry in the roaming table 296 based on the information included in the new base station registration packet as reflected in step 458.

The processor 176, 176' then proceeds to step 460 in which it causes a reduced roaming table update packet to be transmitted to some or all mobile terminals 166 registered to the base station 154, 156. Such packet updates any information which has changed. Thus, for example, if a new entry is created in steps 456 and 458, the update packet in step 460 will contain information allowing the registered mobile terminals 166 to create a corresponding entry in their reduced roaming table 320. The time stamp 302 and test pattern interval 308 information is translated with respect to time as outlined above just in case an appreciable amount of time elapses between step 458 and step 460. In the preferred embodiment, however, such update packet is not sent to a registered mobile terminal 166 in step 460 unless the location of the new base station cell area is known to be in close proximity to the present base station's coverage area. Otherwise, registered mobile terminals 166 may update their reduced roaming tables 320 with entries corresponding to base stations which there is a small likelihood the mobile terminal 166 may encounter. Following step 460, the processor 176,176' returns to step 450. If in step 451 no new base station registration packet is received, the processor 176, 176' also returns to step 450.

In step 452 the processor 176, 176' determines whether a mobile terminal update packet is received from a registered mobile terminal 166. As is explained below in connection with FIGS. 15A–15B, a mobile terminal 166 which newly registers with a base station 154, 156 transmits a mobile terminal update packet to the new base station 154, 156 which includes current hopping sequence timing information and test pattern information for the base station 154,156 with which the mobile terminal 166 was previously registered. Since the mobile terminal 166 was, as of just recently, locked onto the hopping sequence of the base station with which it was previously registered, the mobile terminal 166 can provide timing information which is considered more up to date and hence is used to update the roaming table of the new base station 154, 156. The mobile terminal update packet includes in its data field 254 current time stamp information regarding the particular channel at which the previous base station 154,156 is at the time the mobile terminal update packet is transmitted. Such information is similar to the above mentioned time stamp 284 and is combined with information identifying the previous base station in the format [previous base station ID; channel number] or [previous base station ID; channel number; $t_{dwell}$], for example. In addition, the mobile terminal update packet includes current test pattern interval information in the format [number of hops; offset] which is the same format as the test pattern interval field 288 in FIG. 9. In particular, it is the offset information which is updated since delays, clock variations, or the like may have caused the offset value to be off slightly. The mobile terminal processor 200 calculates such offset in the same manner described above in relation to the base stations.

In the event a mobile terminal update packet is received in step 452, the processor 176,176' proceeds to step 466 in which the processor 176,176' updates the time stamp and test pattern interval information in its roaming table for the specified base station based on the information in the mobile terminal update packet. Specifically, the processor 176,176' takes the [channel number; $t_{dwell}$] information from the mobile terminal update packet and replaces the previous time stamp 304 information therewith. At the same time, the processor 176,176' replaces the value of the time tag $t_{ref}$ in the previous time stamp 304 with the value of the counter 192 or the counter 192 and the counter 194 at the time the mobile terminal update packet is received. Also at the same time, the processor 176,176' replaces the test pattern interval 308 information previously stored in the roaming table 296 with the updated test pattern information in the mobile terminal update packet.

Following step 466, the processor 176, 176' is programmed to broadcast in step 460 the updated time stamp and test pattern interval information obtained in step 466 to any mobile terminal 166 capable of receiving information transmitted from the current base station 154,156. The mobile terminals 116 receiving such information are in turn programmed to disregard information pertaining to a base station not included in its reduced roaming table 320. The mobile terminals 166 are programmed then to update the information in their reduced roaming table 320 based on the update packet. Again following step 460, the processor 176,176' returns to step 450. Also, in the event a mobile terminal update packet is not received in step 452, the processor 176,176' returns to step 450.

In step 453, the processor 176,176' determines if a new registration notice packet has been received in relation to a mobile terminal 166 which either was registered or is currently registered with the base station 154,156 indicating that the particular mobile terminal 166 has now registered with a new base station 154, 156. As is conventional, the new base station 154,156 is programmed to broadcast the registration notice packet on the system backbone 152 to all other base stations 154,156 in the network. The registration notice packet includes in its data field 254 an indication of which particular base station 154,156 the mobile terminal 166 has newly registered with. Based upon receiving the new registration notice packet, the base station 154,156 with which the mobile terminal 166 was previously registered to will clear its registration table of the mobile terminal 166, thereby indicating that the mobile terminal 166 has deregistered with the base station 154,156. In the event a registration notice packet is received in step 453, the processor 176,176' proceeds to step 467. In step 467 the processor 154,156 determines whether the registration notice packet contains new registration information related to a mobile terminal 166 which was previously registered to the base station 154,156. If in step 467 it is determined that the new registration notice packet does not contain information related to a mobile terminal previously registered to the base station 154,156, the processor 176,176' proceeds back to step 450. If it does, the processor 176,176' proceeds to step 468 in which it forwards via the system backbone 152 any packets which it may have buffered in memory due to the deregistering mobile terminal 166 having gone "off-line". As is conventional, when a mobile terminal 166 looks for another base station to register with, the mobile terminal may instruct the base station with which it is currently registered to buffer any packets directed to the mobile terminal 166 and received by the base station. In the event packets have been buffered, the processor 176,176' forwards them to the new base station with which the mobile terminal is newly registered. The new base station 156, 156 then transmits the packets to the mobile terminal 166.

Following step 468, the processor 176,176' in step 470 sets the flag in the roamed to indicator 310 in the roaming table 296 corresponding to the base station to which the mobile terminal 166 roamed. Furthermore, a time stamp relating to the roamed to indicator 310 being set is also maintained in memory so that it may be cleared again if no further roaming occurs in a twenty-four hour period. Following step 470, the processor 176,176' proceeds to step 472 in which it increments by one the value of the roam counter 312 in its roaming table 296 for the base station entry corresponding to the base station to which the mobile terminal 166 roamed and similarly starts a time in memory corresponding to when the incrementation occurred. Next, the processor 176,176' proceeds to step 460 again and transmits a reduced roaming table update packet to those mobile terminals 166 which include in their reduced roaming table 320 the base station to which the mobile terminal had roamed. The reduced roaming table update packet in this case includes in its data field 254 the updated value of the roam counter 312 for that particular base station. The mobile terminals 166 are programmed to update the contents of their corresponding reduced roaming tables 320 as discussed below in relation to FIGS. 15A–15B. After step 460, the processor 176,176' returns to step 450.

Similarly, in the event a registration notice packet is not received as determined in step 453, the processor 176,176' returns to step 450.

Step 454 calls for the processor 176,176' to determine if a registration request packet has been received from a mobile terminal 166. As described below with respect to FIGS. 15A–15B, a mobile terminal 166 which wishes to register with a new base station 154,156 transmits to that base station 154,156 a registration request packet seeking registration. In the event such a packet is received in step 454, the processor 176,176' proceeds to step 480 in which it determines whether the mobile terminal 166 sending the request is permitted to register. For example, if the base station 154,156 is currently servicing a maximum number of mobile terminals, the processor 176,176' may communicate back to the requesting mobile terminal that registration is not permitted. If for some reason registration is not permitted as determined in step 480, the processor 176,176' ignores the registration request and returns to step 450. On the other hand, if the processor 176,'176' determines registration is to be permitted, the processor causes a registration acknowledgment packet to be transmitted to the requesting mobile terminal 166 as represented in step 482.

Following step 482, the processor 176,176' in step 484 constructs a reduced roaming table packet to be transmitted to the mobile terminal 166 which has just been registered. The reduced roaming table information within the packet includes the base station entries from the roaming table 296 which, according to the predefined criteria described herein, are considered to be likely candidates for registration in the event the mobile terminal 166 later roams to another cell. Such reduced roaming table information is utilized by the newly registered mobile terminal 166 to construct a new reduced roaming table 320 as discussed above. The manner in which the reduced roaming table information is formed by the processor 176,176' is described in more detail in relation to FIG. 14. After the reduced roaming table packet is formed, the processor 176,176' causes the packet to be transmitted to the mobile terminal 166 in step 484. At such time, the processor 176,176' performs the aforementioned time translation on the time stamp 304 and test pattern interval 308 information sent to the mobile terminal 166 in order that the information contained therein is current. Following step 484, the processor 176,176' returns to step 450. Similarly, if a registration packet is not received as determined in step 454, the processor 176,176' returns to step 450.

Figure 14:
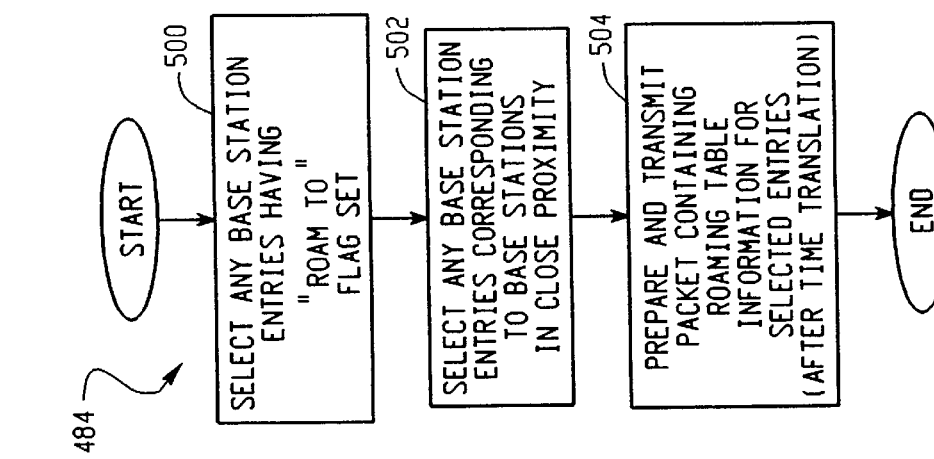
FIG. 14 is a flowchart representing the operation of a base station for constructing and transmitting the contents of a reduced roaming table in accordance with the present invention.

Turning now to FIG. 14, the process in which each base station 154,156 generates reduced roaming table information for the reduced roaming table packet is shown, such process being carried out in step 484 as discussed above. Beginning in step 500, the processor 176,176' in the base station 154,156 checks the contents of its roaming table 296 stored in the memory 178,178' to see if there are any base station entries which have the flag set in the roam to/from indicator 310. If so, those base station entries are selected by the processor 176,176'. Next, in step 502 the processor 176,176' is programmed to select any base station entries from the roaming table 296 which correspond to a base station which is known to be in close proximity of the current base station. For example, each base station 154,156 may be preprogrammed to have a network "map" in memory which is indicative of the relative locations of known base stations on the network.

Accordingly, the processor 176,176' is programmed to look at the network addresses in the base station identification 300 and to select under a predetermined criteria any additional base stations which are in close proximity. As previously indicated, those base stations in close proximity are considered more likely to represent a new base station to which a registered mobile terminal 166 may eventually roam. Following step 502, the processor 176,176' proceeds to step 504 in which it constructs and transmits via the RF section 180,180' the reduced roaming table information packet including the information corresponding to the selected base stations. Note that at the time of transmitting the information the processor 176,176' performs the above-mentioned time translation with respect to the information relating to the time stamps 304 and test pattern intervals 308.

Figure 1:
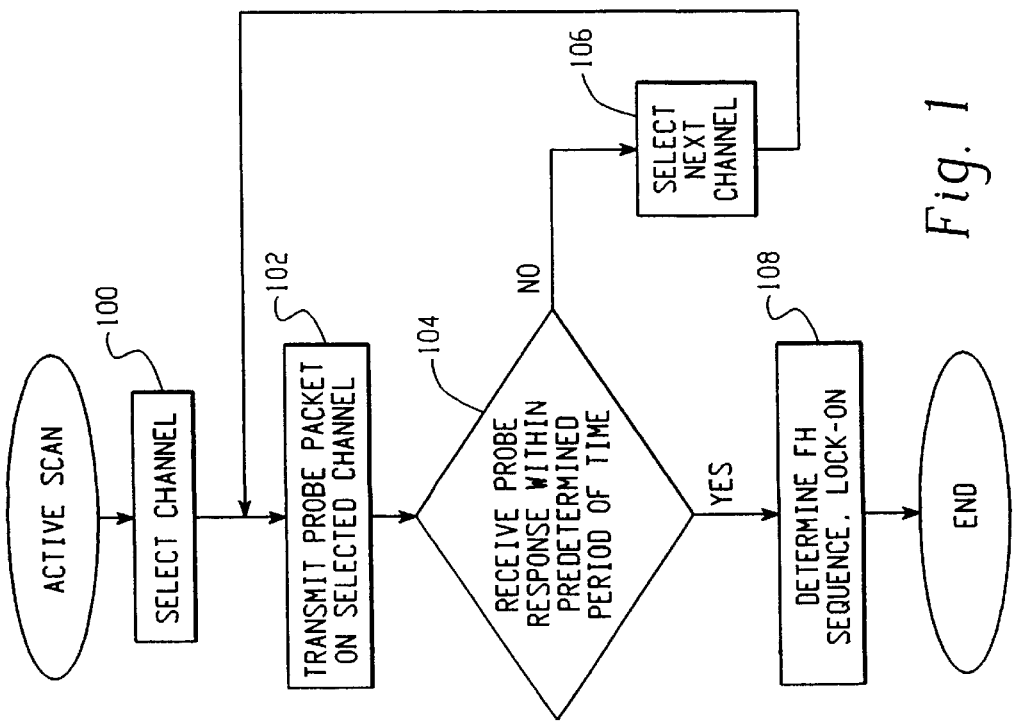
FIG. 1 is a flowchart describing an active scanning mode operation for locking on to a hopping sequence of a new base station.
Figure 15A:
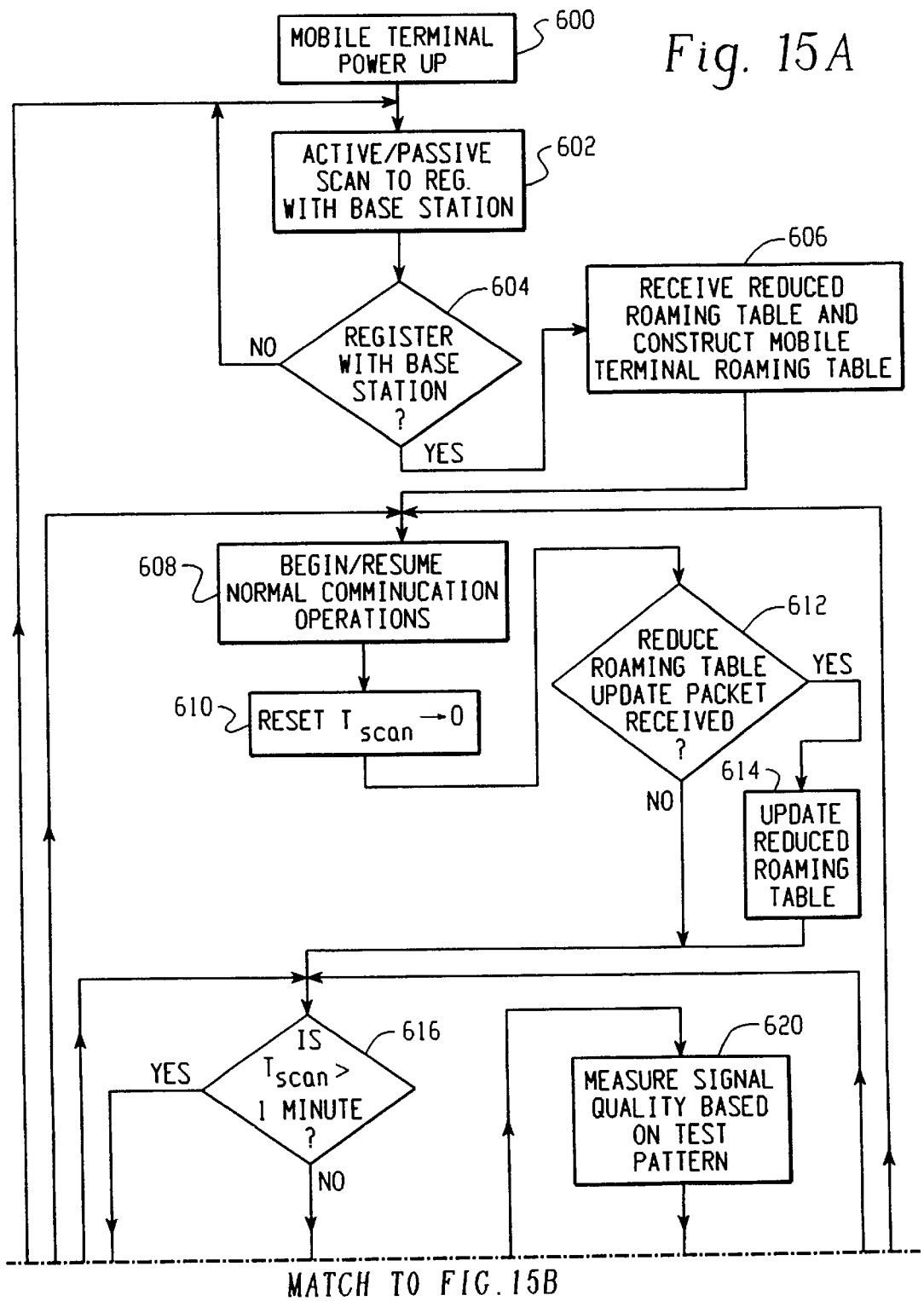
FIGS. 15A–15B show a flowchart representing the operation of a mobile terminal with respect to registering with different base stations such as when roaming from cell to cell in accordance with the present invention.
Figure 15B:
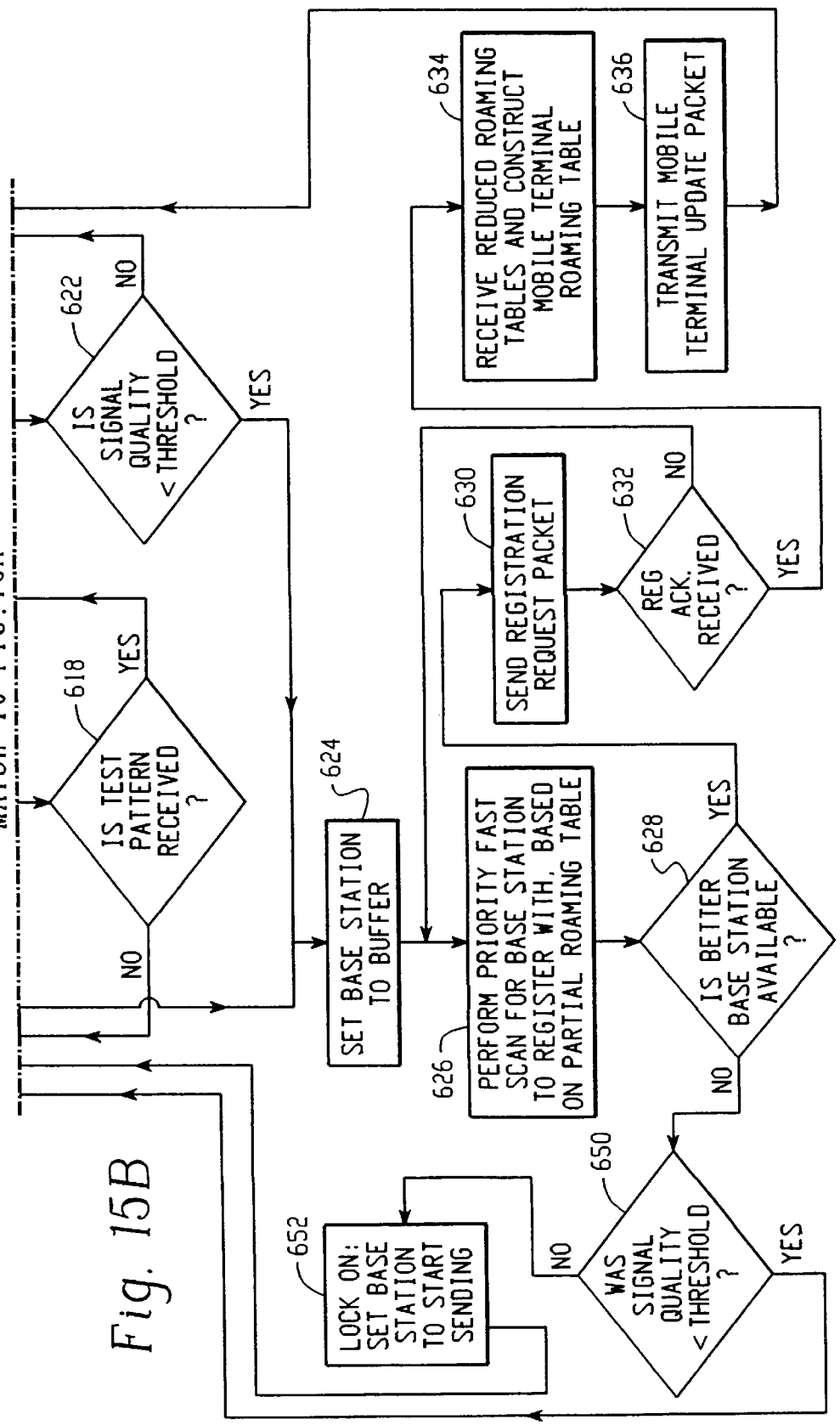

FIGS. 15A–15B represents the operation of each mobile terminal 166 with respect to registering with different base stations when, for example, roaming from cell to cell in accordance with the invention. Step 600 represents when the mobile terminal 166 is initially powered up (e.g., the mobile terminal 166 is turned "on" via a switch). Alternatively, the mobile terminal 166 may be powered up in the sense that it is reset in step 600. In step 600, the mobile terminal 166 goes through any conventional self-initialization routines and the like. Following step 600, the processor 200 in the mobile terminal 166 proceeds to step 602 in which it attempts to register the mobile terminal with a base station 154,156 using conventional active or passive scanning techniques. As will be appreciated, mobile terminals 166 which are first introduced into the system 150 will not have immediate access to any roaming table 296. Therefore, the mobile terminal 166 initially attempts to lock-on to a hopping sequence of a nearby base station 154,156 using conventional techniques. For example, in step 602 the processor 200 may carry out the active scan technique discussed above in relation to FIG. 1. Alternatively, the processor 200 may utilize the conventional passive scan technique described above in connection with FIG. 2.

After the mobile terminal 166 locks-on to the hopping sequence of one of the base stations 154,156 in step 602, the processor 200 proceeds to step 604 in which it attempts to register the mobile terminal 166 with the particular base station 154,156 with which it has just locked on. The processor 200 attempts to register with the base station 154,156 using known protocols such as those described in U.S. Pat. No. 5,276,680, assigned to Telesystems SLW Inc. Such protocols include transmission of a registration request packet as per step 454 in FIG. 13, and receipt of a registration confirmation as per step 482 in FIG. 13. If the mobile terminal 166 is successfully registered with a base station 154, 156 in step 604, the processor 200 proceeds to step 606. Otherwise, the processor 200 returns to step 602 and again attempts to lock on to the hopping sequence of a base station 154, 156.

In step 606, the processor 200 receives via the RF section 212 the reduced roaming table information packet which is sent by the base station 154, 156 with which the mobile terminal 166 is registered therewith as represented in step 484 of FIG. 13. The processor 200 is programmed to proceed to construct a reduced roaming table 320 in the memory 210 based on the reduced roaming table information provided from the base station in the manner described above. In other words, the processor 200 enters the corresponding hopping sequence information 302, time stamp 304, optional beacon interval 306 and test pattern interval 308, and roam counter 312 information for the selected base station entries into the reduced roaming table 320. As previously mentioned, the processor 200 at the time of receiving the reduced roaming table information inserts time tags $t_{ref}$ in the time stamps 304, such time tags $t_{ref}$ being determined based on the outputs of the counters 222 and 224. Furthermore, the processor 200 starts maintaining the last scanned timers 324 for each of the entries in the reduced roaming table 320.

Following step 606, the processor 200 in step 608 controls the mobile terminal 166 so as to begin/resume normal communications within the system. In other words, the mobile terminal 166 performs whatever functions are intended with respect to communicating data to the system backbone 152 via the particular base station 154,156 with which it is registered. At the same time the mobile terminal 166 is performing such operations, however, the processor 200 continues to execute the operations shown in FIGS. 15A–15B. More specifically, following step 608 the processor 200 proceeds to step 610 in which it resets an internal continuous timer $T_{scan}$ (not shown) to zero. Next, in step 612 the processor 200 determines if a reduced roaming table update packet has been received via the RF section 212. As discussed above in relation to step 460 in FIG. 13, the base station 154,156 with which the mobile terminal 166 is registered will send the mobile terminal 166 a reduced roaming table update packet in the event relevant updated information has been received by the base station. If the mobile terminal 166 has received a reduced roaming table update packet in step 412, the processor 200 goes to step 614 in which it updates the reduced roaming table 320 based on the updated information. In the event the updated information relates to any time stamps 304 or test pattern intervals 308 provided by the base station, the processor 200 is programmed to insert a time tag $t_{ref}$ in the corresponding time stamp 304 entries in order to reflect the time at which the information was received. Following step 614, the processor 200 proceeds to step 616. On the other hand, if a reduced roaming table update packet is not received as determined in step 612, the processor 200 proceeds directly to step 616.

In the exemplary embodiment, it is desirable that mobile terminals 166 attempt to lock-on to the hopping sequence of a new base station 154,156 in the event the signal quality between the mobile terminal 166 and its current base station deteriorates (due to roaming to another cell, for example). In addition, however, it is desirable that the mobile terminals 166 periodically check for registration with another base station 154,156 which may provide an improved communication link. Therefore, in step 616 the processor 200 determines whether the timer $T_{scan}$ has reached a predetermined time period since last being reset in step 610. For example, in the preferred embodiment it is desirable that the mobile terminals 166 check at least every minute for registration with another base station. Consequently, in step 616 the processor 200 determines whether $T_{scan}$ is greater than one minute (although some other period is certainly within the scope of the invention). If not, the processor 200 proceeds to step 618 in which it determines whether a test packet has been received from the base station 154,156 with which the mobile terminal is registered. If no, the processor 200 returns to step 616. As a result, during the time the mobile terminal 166 is performing its conventional functions within the system 150 the processor 200 is constantly monitoring in steps 616 and 618 whether a test packet has been received or a minute has passed since the mobile terminal 166 last attempted to register with another base station.

As the mobile terminal 166 begins to roam from one cell 162 (FIG. 3) to another, the signal quality between the mobile terminal 166 and the base station to which it is registered will begin to deteriorate. If a test pattern is received in step 618, the processor 200 goes to step 620 in which the mobile terminal 166 determines the signal quality based on the test pattern according to conventional techniques. If the signal quality is equal to or greater than a predefined threshold as determined in step 622, the processor 200 returns to step 616. However, if the signal quality is less than a predetermined threshold in step 622 due to, for example, the mobile terminal 166 roaming to another cell, interference, signal obstructions, etc., as determined in step 622, the processor 200 proceeds to step 624. Similarly, if $T_{scan}$ is greater than one minute in step 616 the processor proceeds to step 624.

In step 624 the processor 200 begins the process of scanning for a new base station 154,156 which may provide a better communication link with the system backbone. Specifically, the processor 200 in step 624 causes the mobile terminal 166 to transmit a packet to the current base station 154,156 indicating that the mobile terminal 166 is going "off-line" temporarily. For example, in conventional cellular systems the mobile terminal 166 may go into a power savings "sleep" mode during idle periods. Since the mobile terminal 166 will not be fully powered to receive packets transmitted from the base station 154,156, the base station temporarily stores or buffers the packets intended to be sent to the mobile terminal during such time. In order to know when the mobile terminal 166 is going into a sleep mode or is otherwise unavailable to receive packages, the mobile terminal 166 transmits a packet to the base station indicating that it is going "off-line". Thus, when the base station 154,156 receives the packet sent from the mobile terminal in step 624 the base station is programmed to begin buffering any packets it receives that are destined for the mobile terminal.

Figure 17:
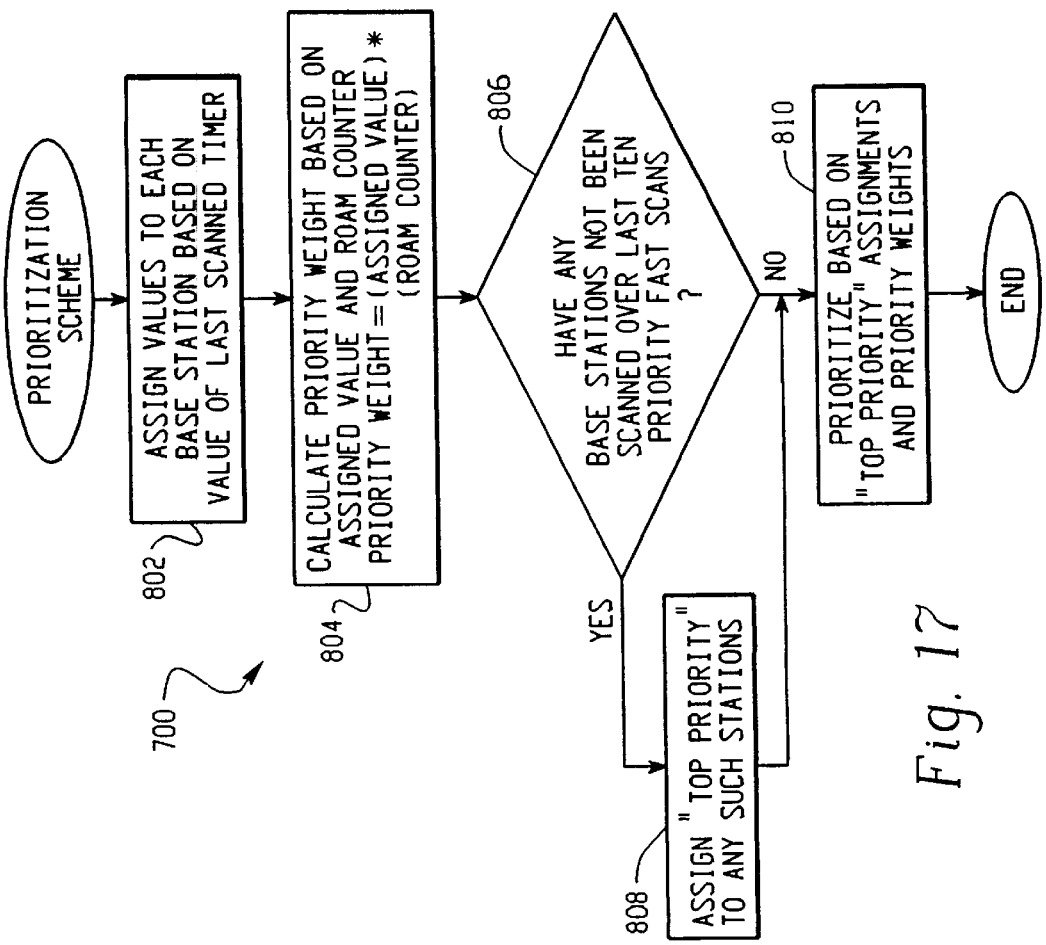
FIG. 17 is a flowchart representing a prioritization scheme for prioritizing the order in which a mobile terminal should attempt to register with the base stations in the reduced roaming table in accordance with the present invention.

Following step 624, the processor 200 proceeds to step 626 in which it performs what is referred to herein as a priority fast scan as is discussed in more detail below in connection with FIGS. 16 and 17. As generally described above, the priority fast scan involves using the contents of the reduced roaming table 320 to scan and lock on quickly to one or more base stations 154,156 which may provide a better communication link with the mobile terminal 166. This enables the mobile terminal 166 which may be roaming from one cell 162 to another to lock on quickly to the base station 154,156 covering the new cell. Based on the hopping sequence, time stamp, beacon interval information, etc. stored in the reduced roaming table 320, the mobile terminal 166 is able to jump directly to the hopping sequence and particular channel where a base station is expected to be at the present time. During the priority fast scan in step 626, the processor 200 identifies the availability of a base station which provides a better signal (i.e., a better communications link) as further explained below.

After performing the priority fast scan in step 626, the processor 200 goes to step 628 in which it determines if a base station 154, 156 providing a better signal than the current base station was identified in step 626. If yes, the processor 200 proceeds to step 630 in which, having locked on to the hopping sequence of the identified base station 154,156 in step 626, the processor 200 causes a registration request packet to be transmitted to the identified base station. As discussed above in relation to steps 454, 480 and 482 in FIG. 13, the new base station 154,156 having received such a registration request packet will respond with a registration acknowledgment packet provided the mobile terminal 166 is permitted to register. Accordingly, in step 632 the processor 200 is programmed to determine if a registration acknowledgment packet has been received in response to the registration request packet transmitted in step 630. If not, the processor 200 returns to step 626 in which it performs the priority fast scan in an attempt to identify another suitable base station.

If a registration acknowledgment packet is received in step 632, the processor 200 then proceeds in step 634 to receive and process the reduced roaming table information received from the new base station 154,156. As described above in connection with step 484 in FIG. 13, the base stations are programmed to transmit a reduced roaming table information packet to a newly registered mobile terminal 166. The processor 200 receives such packet in step 634 and proceeds to construct a new reduced roaming table 320 in the manner set forth above.

Next, in step 636 the processor 200 transmits to the new base station 154,156 the aforementioned mobile terminal update packet (step 452 in FIG. 13). As discussed above, the mobile terminal update packet includes the particular time stamp 304 and test pattern interval 308 offset for the previous base station with which the mobile terminal 166 was registered. Such information is easily computed by the processor 200 based on the fact that up until only recently the mobile terminal 166 was locked on to the hopping sequence of the previous base station. For example, prior to going "off-line" with the previous base station the processor 200 can store temporarily in memory at a given instant the particular channel in the hopping sequence alone or in combination with the dwell time $t_{dwell}$ (as provided by the sync timer 225, for example). In addition, the processor 200 stores for the same given instant the current value of the counters 222 and 224. Thus, when transmitting the mobile terminal update packet in step 636 the processor 200 can calculate the current status of the previous base station based on the change in the current output values of the counters 222 and 224. This information is then included by the processor 200 in the mobile terminal update packet.

Following step 636 the processor 200 returns to step 608 where it begins routine communications again in accordance with the particular system requirements. As is discussed above in relation to FIG. 13, upon the mobile terminal 166 registering with the new base station 154,156, the new base station 154,156 is programmed to broadcast the registration notice packet to the base station 154,156 with which the mobile terminal 166 was previously registered. As a result, the previous base station 154,156 can forward any buffered packets and update its roaming table 296 in the manner described above with respect to steps 468, 470, and 472.

If in step 628 the processor 200 concludes that a better base station signal is not available based on the priority fast scan in step 626, the processor proceeds to step 650. In step 650 the processor 200 ascertains whether or not the most recent time the signal quality with the current base station 154,156 was evaluated (based on the test pattern signal) the signal quality was below the aforementioned predetermined threshold. For example, it is possible that the processor 200 reaches step 650 due to the above discussed periodic scan for other base stations rather than a deterioration of signal quality. If the signal quality was not below the predetermined threshold, the service provided by the current base station 154, 156 is considered sufficient and the processor 200 proceeds to step 652. In step 652 the processor 200 again locks-on to the current base station 154, 156 using known techniques. In particular, the processor 200 knows the precise timing of the current base station 154,156 for the same reasons discussed above in connection with transmitting the mobile terminal update packet in step 636. Hence, the processor 200 can quickly compute exactly where the current base station 154,156 is in its hopping sequence and then lock-on accordingly using the same techniques exemplified in FIGS. 18 and 19 discussed below. Upon locking on, the mobile terminal 166 transmits a notification packet to the base station 154,156 in step 652 informing the base station that the mobile terminal 166 is back "on line". Accordingly, the base station will know to begin sending packets again to the mobile terminal 166. The processor 200 then returns from step 652 back to step 608 in which normal operations are resumed.

If in step 650 it is determined that the signal quality with the current base station was not above the predetermined threshold, it is concluded that the priority fast scan did not result in a suitable base station and a base station 154,156 with suitable signal quality still has to be found. Accordingly, the processor 200 returns back to step 602 in which a conventional active or passive scan is conducted. Since the reduced roaming table 320 in the mobile terminal 166 most likely did not include all base stations within the system 150 for purposes of efficiency, there may be other base stations that can be located as a result of a conventional scan.

Figure 16B:
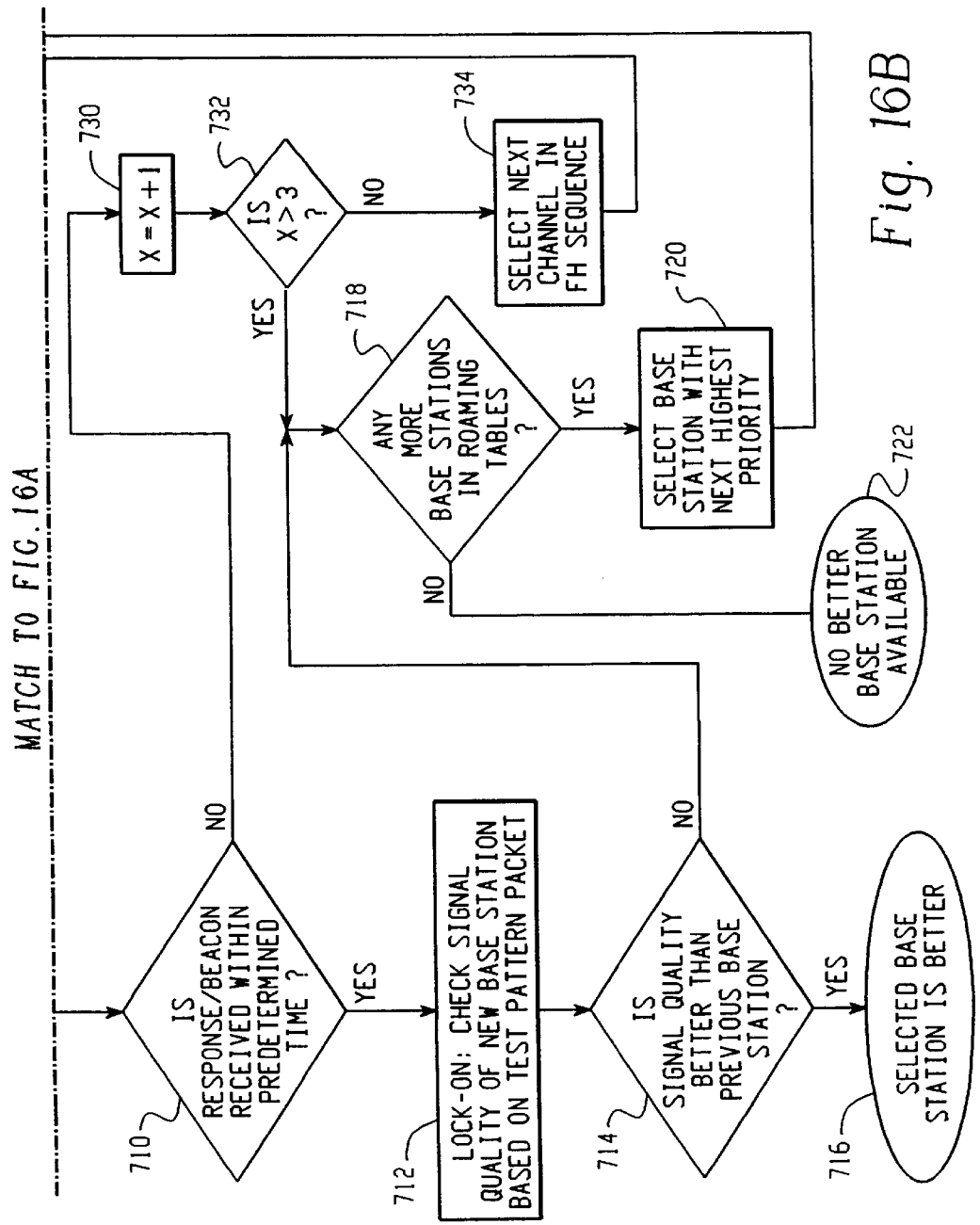

Referring now to FIGS. 16A–16B, the priority fast scan routine referred to in step 626 of FIG. 15B is shown in more detail. The priority fast scan is performed by each mobile terminal 166 based on the information stored in its respective reduced roaming table 320. Beginning in step 700, the processor 200 analyzes the entries included in the reduced roaming table 320 according to a predetermined criteria so as to prioritize the entries in the order in which the processor 200 will attempt to lock onto the respective base stations 154,156. FIG. 17 discussed below gives one example of such a prioritization scheme, although many different schemes can be utilized.

Following step 700, the processor 200 continues to step 702 in which it selects the base station having the highest priority in the reduced roaming table 320 as determined in step 700. Next, in step 704 the processor 200 determines the particular hopping sequence utilized by the selected base station based on the information stored in the sequence information 302. Specifically, the processor 200 obtains the hopping sequence section and pattern from the sequence information 302 stored in the roaming table for the selected base station. Based on the set and pattern, the processor 200 is programmed to look to the frequency hopping sequence table (FIG. 7) maintained in the memory 210 and determine the exact hopping sequence utilized by the selected base station. For example, suppose the sequence information 302 for the selected base station was [set; pattern] equal to [2;B] as represented in FIG. 7. The processor 200 would look to the frequency hopping table maintained in memory 210 and determine that the selected base station was utilizing the frequency hopping sequence $f_{2,B}$, where $f_{2,B}$ is made up of a sequence of seventy-nine channels represented, in time sequence order, by $f_{2,B,1}, f_{2,B,2}, \ldots, f_{2,B,79}$.

Next in step 704, the processor 200 calculates exactly where in its hopping sequence the selected base station 154,156 should be based on the corresponding time stamp 304 stored in the roaming table 320 and the current value of the counter 222 alone or in combination with the counter 224. As will be appreciated, in the embodiment which utilizes both counters 222 and 224 the expected channel locations can be calculated within one millisecond (i.e., the resolution of the counter 224), or within one hundredth of a channel. Alternatively, if just the FH sequence counter 222 is utilized the expected channel locations can be calculated within 100 milliseconds (the resolution of the counter 222), or within one channel. Nevertheless, the exact location of the base station in its hopping sequence is calculated by the processor 200 in step 704 according to the same equations described above for $[\text{channel number}]_{current}$ and $[t_{dwell}]_{current}$ used by base station processors 176,176' prior to sending current channel information to registered mobile terminals 166, with the only difference being that all the counter values now correspond to counter values internal to the mobile terminals as opposed to the base stations. The processor 200 in step 704 then attempts to synchronize the hopping sequence of the mobile terminal 166 itself to that of the selected base station, to the extent possible, based on the expected location of the base station in the same hopping sequence. More specifically, the processor 200 configures the RF section 212 in the mobile terminal 166 to hop according to the hopping sequence of the selected base station 154,156. Even more specifically the processor 200 causes the RF section 21 2 to begin hopping at the particular channel number in the hopping sequence which the selected base station is expected to be at currently as determined in the above equations. Thus, using the above example where the selected base station 154,156 is using the hopping sequence $f_{2,B}$, suppose the expected channel number is 34 based on the time stamp 304 stored in the reduced roaming table. Consequently, the processor 200 would cause the FH sequence modulator 220 to jump immediately to the channel $f_{2,B,34}$ in the hopping sequence $f_{2,B}$, and proceed from there through the hopping sequence.

In the above described embodiment using the timers 194,194' and 224 in addition to the counters 192,192' and 222, the processor 200 also calculates the precise dwell time $t_{dwell}$ that the selected base station is expected to be at as set forth in the above equation. Accordingly, the processor 200 in such embodiment causes the FH sequence modulator 220 to jump immediately to the expected dwell time $t_{dwell}$ location in the expected channel (e.g., channel $f_{2,B,34}$) and proceed from there. At the same time, the processor 200 restarts the sync timer 225 at the expected dwell time location. If in an embodiment which utilizes only the FH sequence counters 192,192' and 222, the processor 200 is programmed to jump each time to a predefined point in the expected channel (e.g., $t_{dwell}=0$). Thus, in step 704 the processor 200 configures the mobile terminal 166 for the same hopping sequence as the selected base station 154,156 at approximately the same point in the hopping sequence.

The degree of correlation between the hopping sequence of the mobile terminal 166 and the selected base station 154,156 in step 704 may not be exact because there may have been some propagation delays associated with exchanging hopping sequence information over the system backbone 152. Consequently, the selected base station 154, 156 may be slightly further ahead in its hopping sequence than is indicated in the time stamp 304 used by the processor 200. Nevertheless, the invention is able to compensate for such offset by rapidly advancing through the next few channels in the hopping sequence in an effort to "catch up" to the base station 154, 156 as discussed below.

Specifically, following step 704 the hopping sequence of the mobile terminal 166 is perhaps only approximately in synchronization with hopping sequence of the selected base station 154, 156 (e.g., within a channel or two). Next, the mobile terminal 166 attempts to synchronize fully, i.e., "lock-on" to the hopping sequence of the selected base station using either active or passive scanning. First, however, following step 704 the processor 200 in step 706 sets a counter variable x equal to zero. Thereafter, the processor 200 in step 708 attempts to lock-on to the selected base station 154,156 using either active or passive scanning by sending a probe packet or waiting for a beacon packet, respectively. In theory the selected base station will currently be at the same point in the hopping sequence as the mobile terminal 166. Thus, for example, if the mobile terminal 166 uses an active mode and sends out a probe packet on a given channel in the hopping sequence, the base station will receive and respond to the probe packet. Alternatively, if the mobile terminal 166 uses a passive scanning mode the mobile terminal will receive a beacon transmitted by the selected base station since they are both on the same channel.

As a result, there is a significant time savings in attempting to lock-on since the mobile terminal need not scan essentially randomly through the possible channels within the system 150 waiting to receive a probe response or a beacon packet. Nevertheless, there is the aforementioned possibility that due to propagation delays, clock skews or the like the selected base station 154,156 is slightly ahead of the mobile terminal 166 in the hopping sequence. Accordingly, in step 708 the processor 200 causes the mobile terminal 166 to transmit a probe packet (in the event active mode scanning is utilized) or listens for a beacon packet (in the event passive mode scanning is utilized) on the channel at which the selected base station is expected to be a such time. Next, in step 710 the processor 200 determines if a probe response packet or beacon (depending on whether active or passive mode scanning is utilized) is received within a predetermined time following the sending of the probe packet or upon first beginning to listen for the beacon packet. For example, if using an active scanning mode the processor 200 may wait approximately 6 msec in step 710 to determine if a probe response packet is received from the selected base station. Such predetermined time (e.g., 6 msec) is preferably much shorter than the overall channel dwell time (e.g., 100 msec), but is long enough for the selected base station to respond in the event it received the probe packet. If using a passive scanning technique, the processor 200 is programmed to wait approximately 50 msec, for example, to receive a beacon from the selected base station. Again, such predetermined time (e.g., 50 msec) is substantially shorter than the overall channel dwell time in the given example, but is likely to encounter one of the beacons transmitted by the selected base station if the base station and mobile terminal are truly on the same channel. The processor 200 also analyzes the source address of the probe response packet or beacon to ensure the received packet originated from the base station it is attempting to lock-on to. The processor 200 discards the packet if it is not from the expected device and handles the situation as though no packet was received.

If in step 710 a probe response packet or beacon packet is received by the mobile terminal 166 within the predetermined time from the device to which the mobile terminal 166 is attempting to lock-on to, the processor 200 proceeds to step 712. In step 712, the mobile terminal 166 literally locks-on to the hopping sequence of the selected base station based on the contents of the probe response packet or beacon packet using conventional techniques. Upon locking on in step 712, the processor 200 waits to receive the next test pattern packet which is transmitted by the selected base station 154,156. Then, using known techniques the particulars of which are not important to the invention, the processor 200 determines the signal quality of the link between the mobile terminal 166 and the selected base station based on the test pattern packet. Following step 712, the processor 200 in step 714 determines whether the signal quality is better than the signal quality provided by the previous base station as last determined in step 620 of FIG. 15A. If the selected base station 154,156 does provide better signal quality than the previous base station as determined in step 714, the processor 200 concludes in step 716 that the selected base station 154,156 is "better". Hence, back in step 628 of FIG. 15B the processor 200 will conclude that a better base station is available and the mobile terminal 166 will proceed to step 630 and register with the base station 154,156 with which it is already locked onto with respect to its hopping sequence.

If in step 714 the processor 200 determines that the signal quality provided by the selected base station 154, 156 is not better than that provided by the previous base station, the processor 200 proceeds to step 718. The processor 200 in step 718 determines whether there are any more base stations included in the reduced roaming table 320 with which the mobile terminal 166 has not yet tried to lock onto since entering step 626. If yes, the processor 200 proceeds to step 720 in which it selects the base station in the roaming table 320 which has the next highest priority as previously determined in step 700. Thereafter, the processor 200 returns to step 704 and the above-described process is repeated for the newly selected base station 154,156. If, however, no more base stations exist as determined in step 718, the processor 200 proceeds to step 722 in which the processor 200 concludes that no better base station is available. Accordingly, back in step 628 of FIG. 15B the processor 200 concludes that no better base station is available and proceeds to step 650.

Referring back to step 710, as noted above it is possible that the selected base station 154,156 may be slightly ahead in the hopping sequence as compared to the mobile terminal 166. As a result, the selected base station may not receive the probe packet or transmit a beacon packet on the same channel as the mobile terminal 166 is on at a given time. Accordingly, the processor 200 in such case will not receive a probe response packet or beacon within the predetermined time in step 710. In this event, the processor 200 initiates a routine whereby the mobile terminal advances a predetermined number of subsequent channels in the hopping sequence in an effort to "catch up" with the base station 154,156. For example, in the present embodiment the processor 200 sequences through up to the next three channels in an effort to lock onto the base station.

More specifically, if in step 710 a probe response packet or beacon is not received within the predetermined period of time the processor 200 proceeds to step 730 in which the value of the counter variable x is incremented by one. Next, the processor 200 proceeds to step 732 in which it determines whether the counter variable x is greater than three. If not, the processor 200 proceeds to step 734 in which it increments by one the expected channel number of the selected base station 154,156 as utilized in step 708. For example, if previously the selected base station 154,156 was expected to be at channel $f_{2,B,34}$ in the hopping sequence, the processor 200 immediately advances the FH sequence modulator 220 by one so as to be at channel $f_{2,B,35}$. Following step 734, the processor returns to step 708 and attempts to lock on in the hopping sequence of the selected base station in the same manner described above.

If in step 710 the mobile terminal 166 still does not receive a probe response packet or beacon packet, the processor 200 again advances the position of the mobile terminal in the hopping sequence by one channel in step 730. Thereafter, the processor again tries to lock on to the selected base station. If, after three additional attempts to lock on via steps 730–734 the mobile terminal 166 is still unsuccessful, the processor 200 in step 732 will proceed directly to step 718. In step 718 the processor 200 determines whether other base stations are available in the reduced roaming table 320 with which to attempt to lock on as previously described. In the exemplary embodiment, the processor 200 is designed to advance through the next three channels in the sequence. Still, it will be appreciated that another number could be used. Furthermore, the mobile terminal 166 can also account for the possibility that due to clock delays, slightly different clock rates, etc., the selected base station 154,156 may be slightly behind the mobile terminal 166 in the hopping sequence. For example, rather than incrementing the expected channel by one in step 734, step 734 may instead consist of decrementing the expected channel by one for up to three times. In other words, the mobile terminal 166 moves back through as many as three channels in the hopping sequence in relation to the originally expected channel as determined in step 704. Thus, another embodiment of the invention involves a combination of incrementing and decrementing in step 734 so as to account for possible misalignment between the mobile terminal and base station hopping sequences in either direction.

It is noted that the various device processing performed as described herein by the various processors is performed at a rate which is substantially instantaneous for the most part compared to the dwell time of each channel in the hopping sequences. As a result, despite that fact that a mobile terminal may attempt to lock on to several different base stations in the reduced roaming table and may advance through several channels in an effort to "catch-up", on the average the mobile terminal will be able to lock-on to a new base station more quickly than if a conventional active or passive scanning technique were utilized.

Figure 18:
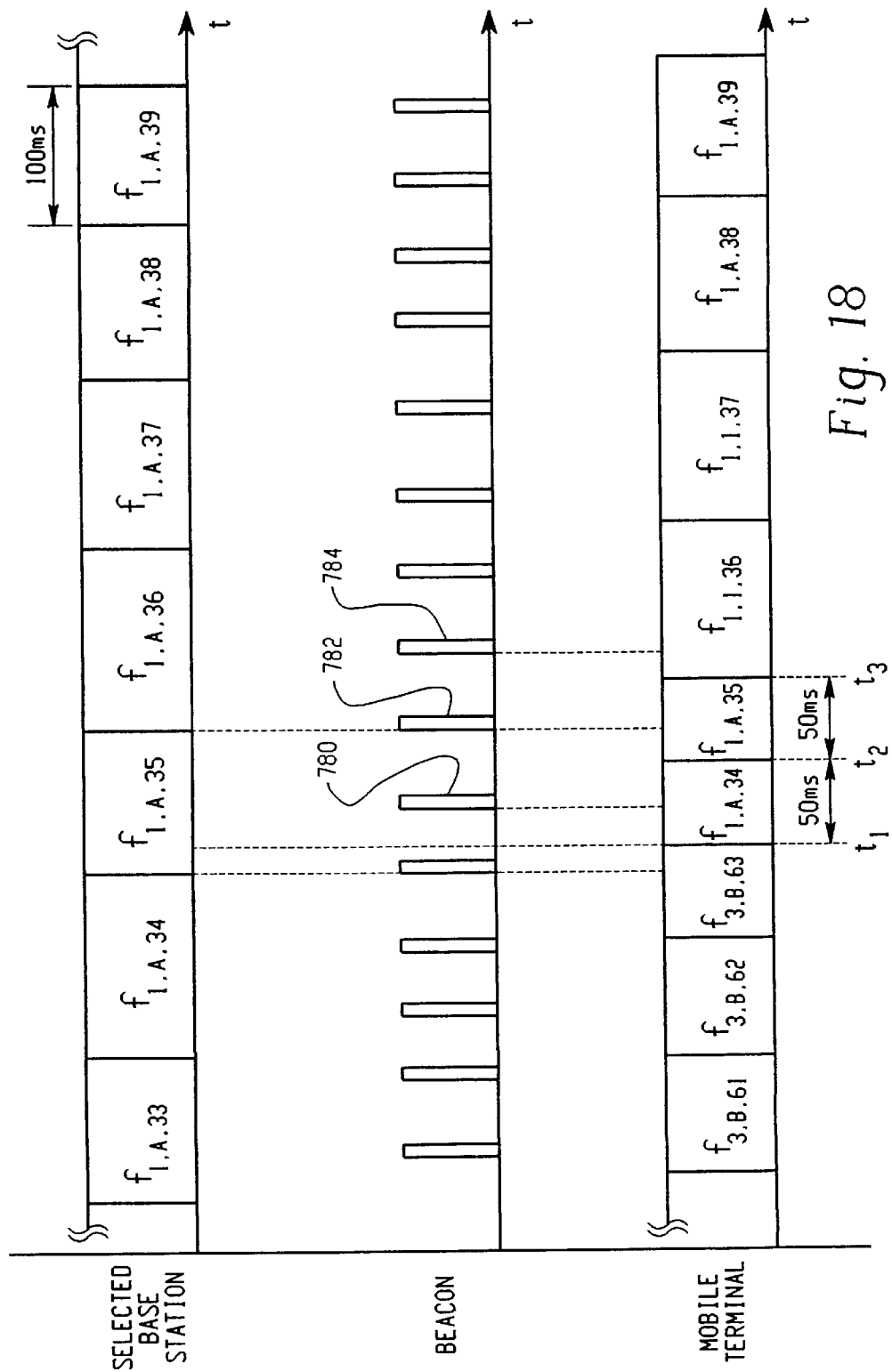
FIG. 18 is a timing diagram illustrating a manner in which a mobile terminal locks-on to a hopping sequence of a new base station using a passive-based fast scan routine in accordance with the present invention.

Briefly referring to FIG. 18, an exemplary timing diagram is shown illustrating how a mobile terminal 166 locks onto a selected base station 154,156 using a passive scanning mode. As set forth above, the channel dwell time in the system is 100 msec, and the base station 154,156 is programmed to transmit a beacon packet at the beginning and middle of every packet as shown in FIG. 18. Prior to time t1 the mobile terminal 166 is registered to another base station 154,156 and is utilizing the hopping sequence $f_{3,B}$. At the same time, the selected base station is utilizing the hopping sequence $f_{1,A}$. Beginning at time t1 the mobile terminal 166 begins the priority fast scan of step 626 in FIG. 15B. Supposing that the sequence information 302 and time stamp information 304 for the selected base station in the reduced roaming table 320 indicated that the base station was currently at channel number 34 in sequence $f_{1,A}$ (as determined in step 704), the mobile terminal 166 at time t1 changes to the hopping sequence $f_{1,A}$ and jumps immediately to channel $f_{1,A,34}$ in the sequence.

The mobile terminal 166 then waits 50 msec to determine whether it receives a beacon packet from the selected base station. While the selected base station 154,156 does in fact transmit a beacon packet 780 during such time, it just so happens that the base station is advanced slightly in the hopping sequence relative to the mobile terminal. Thus, the beacon packet is transmitted on channel $f_{1,A,35}$ whereas the mobile terminal 166 is looking to receive a beacon packet on channel $f_{1,A,34}$. Consequently, the beacon packet 780 is not received by the mobile terminal. Accordingly, at time t2 (50 msec after time t1) the mobile terminal 166 proceeds through steps 730–734 and jumps ahead one channel to channel $f_{1,A,35}$ and waits to receive a beacon packet (steps 708, 710). Again the selected base station 154,156 transmits a beacon packet 782 but this time the beacon packet is transmitted at the beginning of channel $f_{1,A,36}$. As a result, the beacon packet again is not received by the mobile terminal 166. Therefore, at time t3 (50 msec after time t2) the mobile terminal 166 proceeds through steps 730–734 and jumps ahead another one channel to channel $f_{1,A,36}$ and waits to receive a beacon packet (steps 708, 710). Again the selected base station 154,156 transmits a beacon packet 784, but this time the beacon packet is transmitted in the middle of channel $f_{1,A,36}$. As a result, the beacon packet 784 is received by the mobile terminal 166. The mobile terminal can then proceed to lock on in response to the beacon packet using conventional techniques (step 712). As shown in FIG. 18, the mobile terminal is able to lock onto the hopping sequence of the selected base station very quickly based on the information provided in the reduced roaming table 320.

Figure 19:
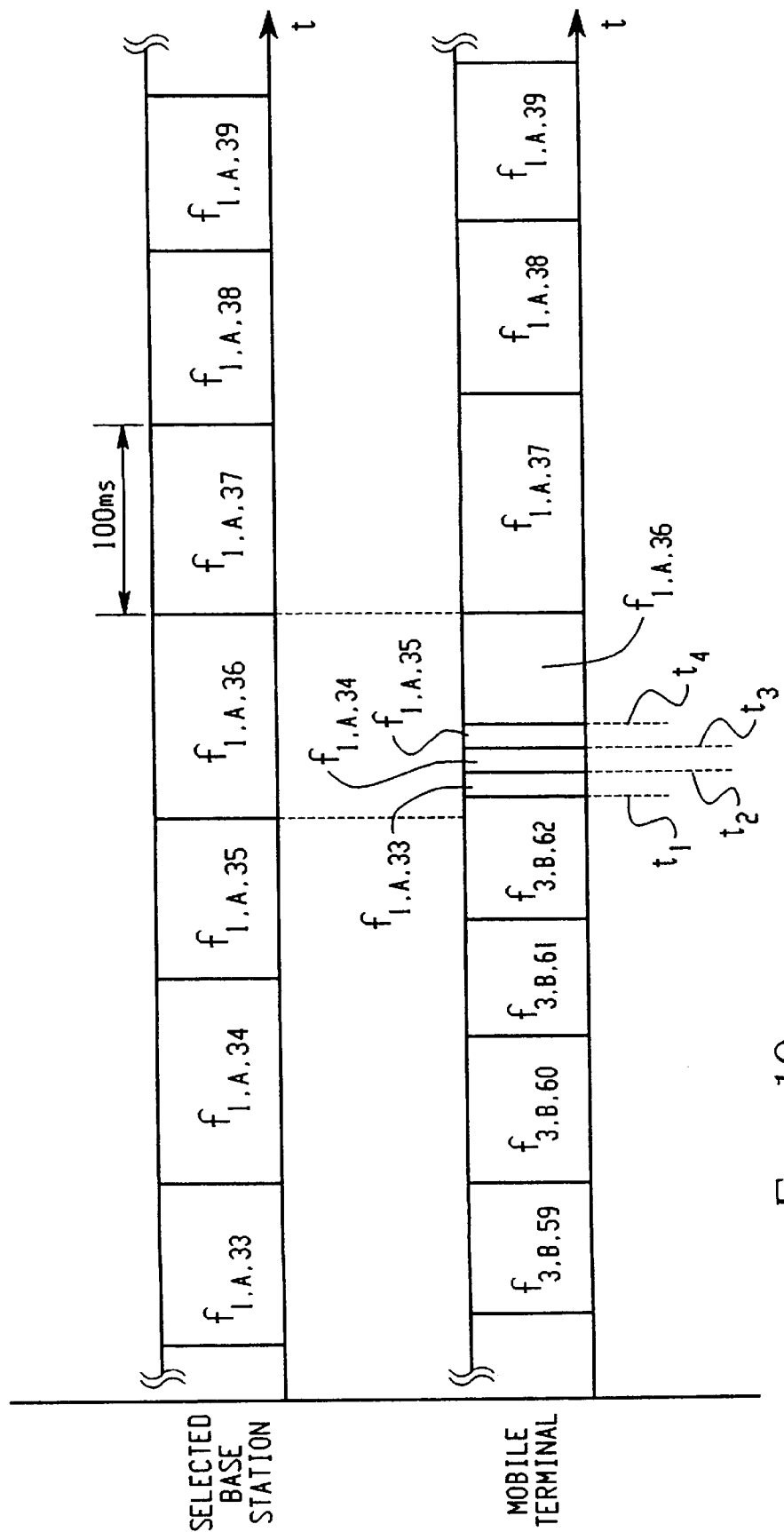
FIG. 19 is a timing diagram illustrating a manner in which a mobile terminal locks-on to a hopping sequence of a new base station using an active-based fast scan routine in accordance with the present invention.

Referring to FIG. 19, an exemplary timing diagram is shown illustrating how a mobile terminal 166 locks onto a selected base station 154,156 using an active scanning mode. Using the same example, the channel dwell time in the system is 100 msec. Prior to time t1 the mobile terminal 166 is registered to another base station 154,156 and is utilizing the hopping sequence $f_{3,B}$. At the same time, the selected base station is utilizing the hopping sequence $f_{1,A}$. Beginning at time t1 the mobile terminal 166 begins the priority fast scan of step 626 in FIG. 15B. Supposing that the sequence information 302 and time stamp information 304 for the respective selected base station in the reduced roaming table 320 indicated that the base station was currently at channel number 33 in sequence $f_{1,A}$ (as determined in step 704), the mobile terminal 166 at time t1 changes to the hopping sequence $f_{1,A}$ and jumps immediately to channel $f_{1,A,33}$ in the sequence.

The mobile terminal 166 then proceeds to transmit a probe packet on channel $f_{1,A,33}$. Again, however, it happens that the selected base station is slightly advanced in the hopping sequence relative to the mobile terminal. As a result, the selected base station does not receive the probe packet as it is on channel $f_{1,A,36}$ at time t1. Accordingly, at time t2 (6 msec after time t1) the mobile terminal 166 proceeds through steps 730–734 and jumps ahead one channel to channel $f_{1,A,34}$, transmits a probe packet, and waits to receive a probe response packet (steps 708, 710). At time t2 the selected base station 154,156 continues to be on channel $f_{1,A,36}$. Therefore, the probe packet is not received. At time t3 (6 msec after time t2), the mobile terminal 166 proceeds through steps 730–734 and jumps ahead another one channel to channel $f_{1,A,35}$ and again transmits a probe packet (steps 708, 710). The selected base station 154,156 continues to remain on channel $f_{1,A,36}$, however, and therefore still does not receive the probe packet. Finally, at time t4 (6 msec after t3) the mobile terminal 166 jumps ahead one more channel to channel $f_{1,A,36}$ and transmits a probe packet. This time the probe packet is transmitted on the same channel which the selected base station is on. As a result, the probe packet is received by the base station and a probe response packet can then be transmitted to the mobile terminal from the base station in response thereto. As shown in FIG. 19, the mobile terminal again is able to lock onto the hopping sequence of the selected base station very quickly based on the information provided in the reduced roaming table 320.

Turning back to FIG. 17, an exemplary prioritization scheme for use in prioritizing the base stations in the reduced roaming table 320 in step 700 of FIG. 16A is shown. Nevertheless, it will be appreciated that other prioritization schemes could also be used. Beginning in step 802, the processor 200 in the mobile terminal assigns a value to each base station entry in the reduced roaming table 320 based on the value of the last scanned timer 324. The higher the value of the last scanned timer 324, the higher the value assigned. For example, the following table can be used for assigning values to each base station in the reduced roaming table 320:

| Last Scan Timer Value (in seconds) | Assigned Value. |
|---|---|
| 0.00 to 0.49 | 1 |
| 0.50 to 0.99 | 2 |
| 1.00 to 1.49 | 3 |
| 1.50 to 1.99 | 5 |
| 2.00 to 2.99 | 8 |
| 3.00 to 3.99 | 10 |
| 4.00 or greater | 15 |

Following step 802, the processor 200 proceeds to step 804 in which it calculates a priority weight for each of the base stations included in the roaming table 320 based on the values assigned in step 802 and the value of the corresponding roam counter 312. For example, the priority weight of each base station is calculated using the equation:

priority weight=(assigned value)×(roam counter value).

Next, in step 806 the processor 200 determines whether any base stations included in the reduced roaming table 320 have not been scanned (i.e., attempted to be locked onto) in the last ten occurrences of the priority fast scan (step 626 in FIG. 15B). If yes, any such base stations are assigned "top priority" status in step 808 following step 806. Thereafter, the processor proceeds to step 810. Similarly, if no base stations meet the aforementioned criteria in step 806, the processor 200 proceeds to step 810.

In step 810 the processor 200 prioritizes the base stations in order as follows. Those base stations assigned "top priority" status in step 808 are given higher priority over any other base stations regardless of their priority weights calculated in step 804. In the event there is more than one base station assigned "top priority", such base stations are prioritized in the order of those having the highest priority weights. In the event there is a tie among priority weights, priority is given to the base station having the highest roam counter value.

Among the base stations not assigned "top priority", these base stations are ordered by way of the base station with the highest priority weight. In the event of a tie between base stations, priority is given to the base station having the highest roam counter value. Following step 810, the processor 200 returns to step 702 in FIG. 16A.

According to another prioritization scheme in which passive scanning is used during the priority fast scan, the processor 200 takes into account the expected timing of the beacon packets from the base stations 154,156. For example, in addition to the priority weighting and "top priority" status discussed in relation to FIG. 17, the processor 200 may use the information in the optional beacon interval field 306 for each base station. Among base stations having the same or similar priority, the processor 200 can choose to select first the base station which is expected to be the first in time to transmit a beacon packet (as determined from the beacon interval fields 306). This way additional time can be saved due to the increased probability of locking onto a base station more quickly.

Alternatively, in another prioritization scheme using either active or passive scanning, the processor 200 is programmed to take into account the expected timing of the test patterns from the selected base stations 154,156. For example, among base stations having the same or similar priority as determined in connection with FIG. 17, the processor 200 may look to which base station is expected to be the first in time to transmit a test pattern packet. The processor 200 can easily compute such information based on the contents of the optional test interval fields 308. The processor 200 is programmed to select such base station first so as to reduce the time associated with waiting to receive a test packet from a selected base station.

Figure 20:
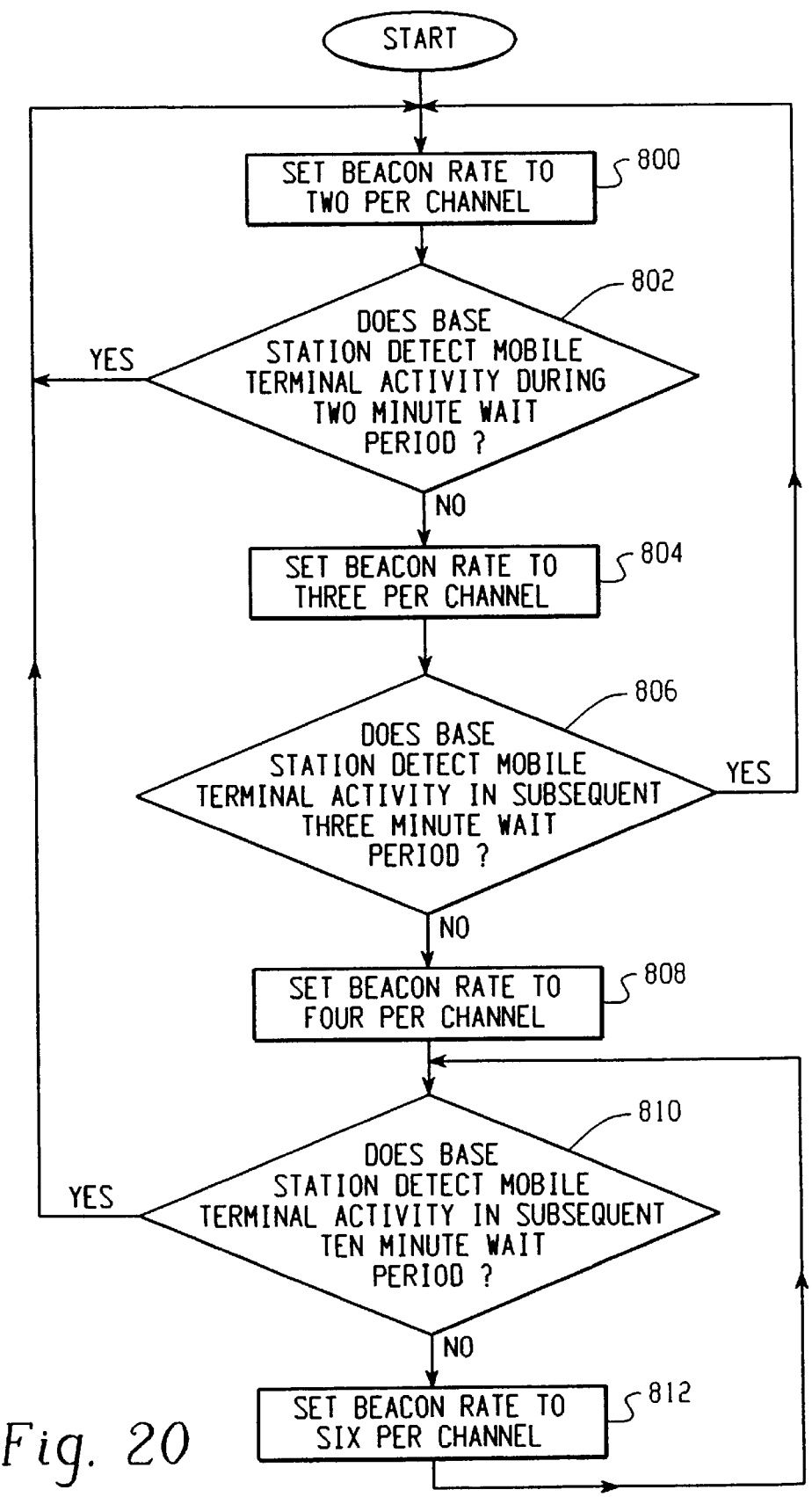
FIG. 20 is a flowchart describing an improved passive scan technique in accordance with the present invention.

Referring now to FIG. 20, an improved passive scanning technique is shown for improving the time required for a mobile terminal 166 to lock-on to a base station in the absence of a reduced roaming table. For example, such technique is useful in step 602 of FIG. 15A where the mobile terminal 166 attempts to lock-on using conventional techniques. The technique relates primarily in the manner in which the base station 154,156 is programmed to adjust the rate of beacon packets which it sends out based on the amount of mobile terminal activity the base station is handling. The less mobile terminal activity the base station 154,156 is handling the more the base station is likely to be available to handle a newly registered mobile terminal. Similarly, the more mobile terminal activity the base station 154,156 is handling the less likely the base station is to be available to handle a newly registered mobile terminal. Accordingly, if the base station 154,156 is handling much mobile terminal activity it may reduce the number of beacons per channel whereas if it is handling less mobile terminal activity it may increase the number of beacons per channel which are transmitted. Nevertheless, it is preferred that the base station at a minimum always transmit beacons at the times indicated in the beacon interval field 306. This ensures compatibility with systems using a priority scheme based on the expected timing of the beacon packets as discussed above. Additional beacons can be transmitted at equally spaced intervals to the extent possible.

Beginning in step 800, the processor 176,176' is programmed to set the beacon rate at two per channel, for example, at the beginning and middle of the channel. Next, in step 802 the processor 176,176' determines if the base station 154,156 has had any normal communication activity in relation to registered mobile terminals 166 within a two minute wait period, for example. If yes, the processor 176,176' returns to step 800. If no, the processor 176,176' proceeds to step 804 in which it adjusts the rate of beacon packets transmitted by the base station to three per channel, for example. Thus, it becomes more probable that a mobile terminal listening for a beacon packet from the base station will receive a beacon packet.

Following step 804, the processor 176,176' determines in step 806 if the base station has had any normal communication activity in relation to a registered mobile terminal 166 within a subsequent three minute wait period, for example. If yes, the processor 176,176' returns to step 802 as shown. If no, the processor 176,176' proceeds to step 808 in which it sets the rate of beacon packets transmitted by the base station to four per channel, for example. Thus, it becomes even more probable that a beacon broadcast by the base station will be received by a mobile terminal 166.

Following step 808, the processor 176,176' determines in step 810 if the base station has had any normal communication activity in relation to a registered mobile terminal 166 within a subsequent ten minute wait period, for example. If yes, the processor 176,176' returns to step 806 as shown. If no, the processor 176,176' proceeds to step 812 in which it sets the rate of beacon packets transmitted by the base station to six per channel, for example. Thus, it becomes even more probable that a beacon broadcast by the base station will be received by a mobile terminal 166. As soon as new communication activity is detected with respect to a mobile terminal 166, the base station reverts back to two beacon packets per channel as shown.

Figure 21:
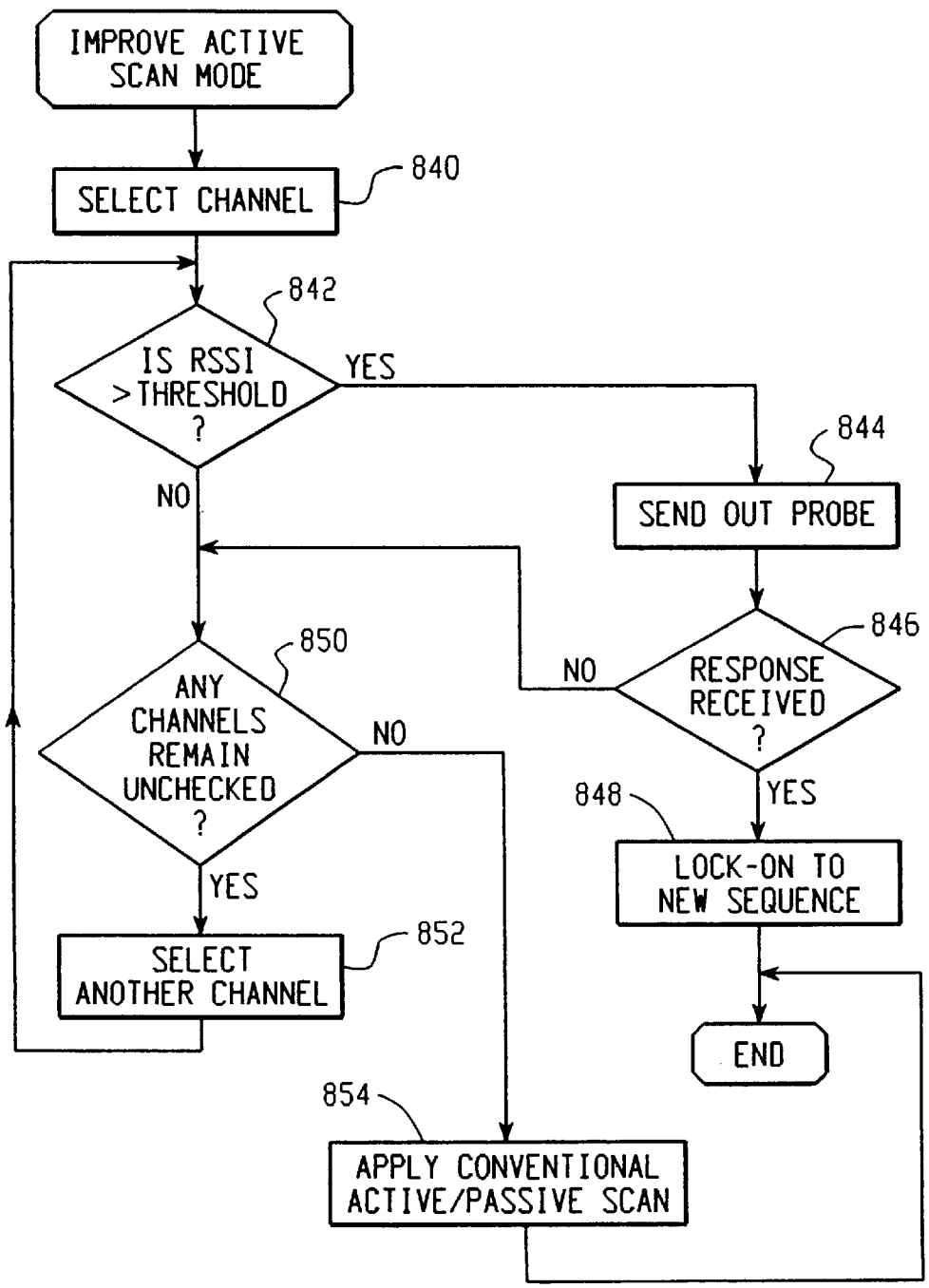
FIG. 21 is a flowchart describing an improved active scan technique in accordance with the present invention.

FIG. 21 illustrates an improved active scanning technique which again is useful for improving the time which it takes for a mobile terminal 166 to lock-on to a base station as compared to conventional techniques. For example, the technique shown in FIG. 21 can be used in step 602 of FIG. 15A where the mobile terminal 166 does not have a reduced roaming table 320 upon which to rely. The improvement relates to a mobile terminal 166 scanning through all possible frequency channels at a very fast rate (e.g., 2 msec/channel vs. 6 msec/channel) and listening for any activity as determined by the RSSI indicator 226 (FIG. 226). If any activity is detected, a probe packet is transmitted by the mobile terminal 166 and the mobile terminal then listens for a response. Since the mobile terminal does not send a probe and wait for a response every frequency channel, better acquisition time can be achieved.

Beginning in step 840 of FIG. 21, the mobile terminal processor 200 is programmed to select one of the possible frequency channels and configure the RF section 212 to receive signals at that frequency. Next, in step 842 the processor 200 evaluates the RSSI signal from the RSSI indicator 226 to determine if the received signal exceeds a predetermined threshold during a 2 msec period. Such predetermined threshold is selected so as to require that a signal exceed the noise level of the environment of the system 150 so as to indicate an actual signal. In the event the RSSI does exceed the predetermined threshold, there is a strong likelihood that a base station 154,156 exists which is receiving on that frequency. Hence, the processor 200 proceeds to step 844 in which it causes a probe packet to be transmitted via the RF section 212. Next, in step 846 the processor 200 waits a predetermined period of time (e.g., 6 msec) to see if a probe response packet is received from a base station 154,156. If a probe response packet is received, the processor 200 proceeds to step 848 in which the mobile terminal 166 then locks on to hopping sequence of the base station based on the probe response packet according to conventional techniques.

If a probe response packet is not received by the mobile terminal 166 in step 846, the processor 200 proceeds to step 850. Similarly, if the RSSI signal in step 842 is not above the predetermined threshold then the processor 200 proceeds to step 850 as shown. In step 850, the processor 200 determines if any of the other possible frequency channels remain unchecked with respect to activity. If yes, the processor 200 goes to step 852 in which it selects one of the remaining unchecked frequency channels prior to returning to step 842. If no, the processor goes to step 854 in which it reverts back to the conventional active or passive scanning modes in an effort to lock on to a base station.

Although the invention has been described primarily with reference to a frequency hopping system it could also be readily used with any system in which a mobile terminal or device must "lock-on" to different communication parameters used by different base stations. For example, it may be the case that alternate base stations communicate using different modulation schemes such as BPSK or QPSK and/or using different PN coding sequences in the case of a direct sequence spreading system. In such case, the roaming tables 296 and 320 each have a field which stores modulation scheme information which can be passed along to a mobile terminal in the same manner described above in relation to passing information regarding the particular hopping sequences which are utilized. Prior to roaming from one cell to another, a mobile terminal may evaluate the possible modulation schemes and determine whether it is preferable to communicate using one modulation scheme over another. Based on the information in the roaming table 320 the mobile terminal attempts first to register with the base station using the preferred modulation scheme. In this manner, a more efficient and desirable registration scheme is provided.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. In a cellular communication system comprising a backbone, and a first base station and a plurality of associated base stations each coupled to said backbone, each of said plurality of base stations respectively communicating on a selected one of a plurality of communication channels, a method comprising the steps of:

each of said plurality of associated base stations conveying information to said first base station related to said respective communication thereof;

said first base station receiving said information in a memory and transmitting selected information to an associated mobile device registered with said first base station, wherein the selected information is associated only with a reduced set of the plurality of associated base stations which are predetermined to have a cell area selected from one of adjacent to and overlapping with the cell area of the first base station;

said mobile device registering with one of the reduced set of the plurality of associated base stations based on the selected information.

2. The method of claim 1, wherein each of said plurality of communication channels is represented by at least one of a unique hop sequence, a unique modulation type, and a unique PN code.

3. The method of claim 1, wherein said information is conveyed to said first base station in a packet format.

4. The method of claim 1, wherein said first base station selects its own communication channel based at least in part on the information received from said plurality of associated base stations.

5. The method of claim 4, wherein said first base station selects its own communication channel such that it is different than the communication channel upon which any of said plurality of associated base stations are operating.

6. The method of claim 1, wherein said information received by said first base station includes hop sequence information and timing information.

7. The method of claim 6, wherein said information received by said first base station further includes test pattern interval information.

8. The method of claim 6, wherein said information received by said first base station further includes beacon interval information.

9. In a cellular communication system comprising a backbone, and a plurality of base stations each coupled to said backbone, each of said base stations communicating on a selected one of a plurality of communication channels, a method of informing a mobile device registered to a first of said plurality of base stations of respective communication channel information related to a plurality of associated base stations, comprising the steps of:
each of said plurality of associated base stations conveying information to said first base station related to said respective communication channel thereof;
said first base station receiving said information; and
said first base station transmitting a selected portion of said information to said mobile device wherein the selected portion of said information is associated only with a reduced set of the plurality of associated base stations which are predetermined to have a cell area selected from one of adjacent to and overlapping with the cell area of the first base station.

10. The method of claim 9, wherein said step of transmitting at least a portion of said information occurs prior to said mobile device registering with one of said plurality of associated base stations.

11. The method of claim 9, wherein each of said plurality of communication channels is represented by at least one of a unique hop sequence, a unique modulation type, and a unique PN code.

12. The method of claim 11, wherein said mobile device is a mobile terminal.

13. The method of claim 9, wherein said information is conveyed to said first base station in a packet format.

14. The method of claim 9, wherein said selected portion of said information transmitted to the mobile device includes hop sequence information and timing information.

15. The method of claim 14, wherein said mobile device jumps directly to the communication channel which one of said plurality of associated base stations is expected to be at based at least in part on the hop sequence information and the timing information transmitted.

16. A cellular communication system, comprising:
a backbone;
a plurality of base stations each coupled to said backbone, each of said base stations communicating on one of a plurality of different communication channels;
at least one mobile device, each of said mobile devices communicating with said backbone via registration with a selected one of said plurality of base stations, each of said base stations including:
wireless communication means for communicating information between said backbone and any of said at least one mobile devices which are registered to said base station;
means for conveying communication channel information to other of said plurality of base stations in said cellular communication system;
means for receiving communication channel information from said other base stations; and
means for wirelessly transmitting a selected portion of said communication channel information received to mobile devices currently registered to said base station, wherein said selected portion of said communication channel information is associated only with a reduced set of the plurality of base stations which are predetermined to have a cell area selected from one of adjacent to and overlapping with the cell area of said currently registered base station.

17. The system of claim 16, wherein each of said plurality of communication channels is represented by at least one of a unique hop sequence, a unique modulation type, and a unique PN code.

18. The system of claim 16, wherein said information received from said other base stations includes hop sequence information and timing information related to said other base stations communication channel.

19. The system of claim 18, wherein said information received from said other base stations further includes test pattern interval information.

20. The system of claim 18, wherein said information received from said other base stations further includes beacon interval information.

21. The system of claim 16, wherein each of said base stations further includes:
means of wirelessly transmitting a roaming counter to said mobile devices currently registered to said base station, said information wirelessly transmitted to mobile devices currrntly registered to said base station includes a roaming counter including a value representing a number of times a respective mobile terminal previously registered to said base station roamed to another of said plurality of base stations over a predetermined period of time.

22. A base station for use in a cellular communication system, comprising said base station along with a plurality of similar associated base stations each of which are coupled to a backbone, with each of said plurality of similar associated base stations each of which arc coupled to a backbone, with each of said plurality of similar associated base stations potentially serving as a respective wireless communication link between said backbone and at least one mobile device registered thereto, said base station comprising:
wireless communication means for communicating information between said backbone and any of said at least one mobile devices which are registered to said base station;
means for conveying communication channel information to other of said plurality of similar associated base stations in said cellular communication system;
means for receiving communication channel information from said other plurality of similar associated base stations; and means for wirelessly transmitting a selected portion of said communication channel information received from said other plurality of similar associated base stations to said at least one mobile device currently registered to said base station wherein said selected portion of said communication channel information is associated only with a reduced set of the plurality of base stations which are predetermined to have a cell area selected from one adjacent to and overlapping with the cell area of said currently registered base station.

23. The base station of claim 22, further comprising:

means for wirelessly transmitting a roamed to counter to said mobile devices currently registered to said base station, wherein said roamed to counter includes a value representing a number of times a respective mobile terminal previously registered to said base station roamed to another of said plurality of similar associated base stations over a predetermined period of time.

24. The base station of claim 22, further comprising:

means for wirelessly transmitting updated information to said mobile devices currently registered to said base station, wherein said updated information includes updated communication channel information related to at least a portion of said at least one plurality of similar associated base stations.

25. The base station of claim 22, wherein said communication channel information includes hop sequence information and timing information.

26. The base station of claim 22, wherein communication channel information is conveyed in packet format.

27. In a cellular communication system comprising a backbone, and a plurality of base stations each coupled to said backbone, each of said base stations communicating on a selected one of a plurality of communication channels, a method of transferring communication channel information, comprising the steps of:

transmitting to a first of said plurality of base stations communications channel information related to of at least one of said plurality of base stations by a mobile device receiving said communication channel information by said first base station; and transmitting selected portions of said communication channel information to an associated mobile device registered with said first base station, wherein the selected information is associated only with a reduced set of the plurality of base stations which are predetermined to have a cell area selected from one of adjacent to and overlapping with the cell area of the first base station.

28. The method of claim 27, wherein said mobile device was previously registered with another of said plurality of base stations.

29. The method of claim 28, further comprising the step of:

determining at said first base station a roam to indicator indicative of which of said plurality of associated base stations said mobile terminal registered therewith was previously registered.

30. The method of claim 27, wherein said communication channel information includes hop sequence information and timing information.

31. A method of facilitating a mobile terminal's ability to lock on to a base station communication channel upon said mobile terminal passively scanning for said communication channel by listening for beacons transmitted by said base station, said method comprising the step of decreasing an interval between which beacons are transmitted by said base station if current traffic load on said base station is below a predetermined threshold.

32. A mobile device for use in a cellular communication system, said cellular communication system comprising a backbone and a plurality of base stations coupled thereto, said mobile device capable of communicating with said backbone via one of said plurality of base stations to which the mobile device is currently registered; said mobile device comprising:

wireless communication means for communicating information between said mobile device and said backbone;

means for receiving roaming information from said one base station, said roaming information including communication channel information related to other of said base stations wherein said roaming information includes only communication channel information related to base stations which are predetermined to have a cell area selected from one of adjacent to and overlapping with the cell area of the one base station; and means for jumping directly to a communication channel at which one of said other base stations is expected to be based in part on received roaming information.

33. The mobile device of claim 32, further comprising:

means for moving quickly through at least one other communication channel at which said one base station is expected to be in the event said mobile device is not able to lock on to said one base station upon jumping directly to said communication channel.

34. The mobile device of claim 32, further comprising:

means for prioritizing an order in which to attempt to lock on to said other base stations based in part on said roaming information.

35. The mobile device of claim 34, wherein said order selected is based in part on a roam counter information included in said roaming information, said roam counter information having values representing the number of times mobile terminals previously registered to said one base station roamed to each of said other base stations over a predetermined period of time.

36. The mobile device of claim 32, wherein said communication channel information includes hop sequence information and timing information.

37. The mobile device of claim 32, wherein said mobile device is a mobile terminal having a bar code scanner.

38. The mobile device of claim 32, wherein said roaming information is received in packet format.

39. A mobile device for use in a cellular communication system, said cellular communication system comprising a backbone and a plurality of base stations having respective cell areas coupled thereto, said mobile device capable of communicating with said backbone via one of said plurality of base stations to which the mobile device is currently registered, said mobile device comprising:

wireless communication means for communicating information between said mobile device and said backbone;

means for receiving communication information, including hop sequence information related to other of said base stations from said one base station;

means for storing said hop sequence information;

means for computing a communication channel at which at least one of said other base stations is expected to be based on said hop sequence information, wherein said communication information includes a roam counter valve indicative of which of said plurality of base stations have cell areas selected from one of adjacent to and overlapping with the cell area of said one base station; and means for jumping directly to the communication channel.

40. The mobile device of claim 39, wherein said mobile device is a mobile terminal having a bar code reader.

41. The mobile device of claim 39, wherein said mobile device further comprises:

means for determining whether said at least one other base station is communicating on said communication channel by listening for beacons on said communication channel.

42. The mobile device of claim 41, further comprising:

means for moving quickly through at least one other communication channel at which said one other base station is expected to be in the event said mobile device does not receive a beacon.

43. The mobile device of claim 39, wherein said mobile device further comprises:

means for determining whether said at least one other base station is communicating on said communication channel by transmitting a probe packet on said communication channel and waiting a predetermined period of time to receive a response.

44. The mobile device of claim 43, further comprising:

means for moving quickly through at least one other communication channel at which said one other base station is expected to be in the event said mobile device does not receive a response.

45. In a cellular communication system comprising a backbone, and first and second base stations each coupled to said backbone, each of said first and second base stations communicating on a selected one of a plurality of communication channels, a method comprising the steps of:

conveying from said second base station to said first base station information related to said second base station's hopping sequence;

receiving said information by said first base station;

storing said information in memory associated with said first base station;

computing within said first base station a communication channel upon which said second base station is expected to be, based on said information stored in said first base station;

transmitting from said first base station to a registered mobile device said communication channel computed; and receiving said communication channel computed by said mobile device.

46. The method of claim 45, wherein said mobile device jumps directly to a current communication channel upon which said second base station is expected to be based on said received communication channel and listens for beacons on said current communication channel to determine whether said second base station is currently communicating on said current communication channel.

* * * * *